United States Patent
Yamazaki et al.

(10) Patent No.: US 7,464,626 B2
(45) Date of Patent: Dec. 16, 2008

(54) TORQUE TRANSMISSION APPARATUS AND CASE STRUCTURE

(75) Inventors: Nobushi Yamazaki, Tochigi (JP); Masao Teraoka, Tochigi (JP); Isao Hirota, Tochigi (JP); Naoshi Mogami, Tochigi (JP)

(73) Assignee: Tochigi Fuji Sangyo Kabushiki Kaisha, Tochigi-shi (JP)

( * ) Notice: Subject to any disclaimer, the term of this patent is extended or adjusted under 35 U.S.C. 154(b) by 0 days.

(21) Appl. No.: 11/725,954

(22) Filed: Mar. 20, 2007

(65) Prior Publication Data

US 2007/0170030 A1 Jul. 26, 2007

Related U.S. Application Data

(62) Division of application No. 10/952,697, filed on Sep. 29, 2004, now Pat. No. 7,210,565.

(30) Foreign Application Priority Data

| Nov. 14, 2003 | (JP) | ............ P2003-385838 |
| Dec. 24, 2003 | (JP) | ............ P2003-427440 |
| Dec. 24, 2003 | (JP) | ............ P2003-427441 |
| Jun. 10, 2004 | (JP) | ............ P2004-173035 |

(51) Int. Cl.
*F16H 57/02* (2006.01)
*F16H 57/04* (2006.01)
*F16H 61/00* (2006.01)
*F16H 48/20* (2006.01)

(52) U.S. Cl. .......... 74/606 R; 192/35; 475/223
(58) Field of Classification Search .......... 74/606 R, 74/607; 192/35, 110 B, 112; 475/223
See application file for complete search history.

(56) References Cited

U.S. PATENT DOCUMENTS

| 6,012,560 | A  | * | 1/2000  | Kuroda et al. ......... 192/35 |
| 6,349,809 | B1 | * | 2/2002  | Isley, Jr. ......... 192/35 |
| 6,481,541 | B2 | * | 11/2002 | Taki et al. ......... 188/71.5 |
| 6,709,357 | B2 | * | 3/2004  | Schleuder et al. ......... 475/223 |
| 7,083,030 | B2 | * | 8/2006  | Dolan ......... 192/35 |

FOREIGN PATENT DOCUMENTS

EP 0 288 950 * 11/1988 ............ 74/606 R

\* cited by examiner

*Primary Examiner*—Vinh T. Luong
(74) *Attorney, Agent, or Firm*—Jordan and Hamburg LLP

(57) ABSTRACT

A torque transmission coupling includes a rotating shaft and a drive pinion shaft for carrying out input and output transmission of a torque. A torque control part is arranged between the rotating shaft and the drive pinion shaft for controlling torque transmission between the rotating shaft and the drive pinion shaft on the basis of a frictional engagement caused by an electromagnetic force of an electromagnet. At least a portion of the torque control part is arranged in an outer periphery of a taper roller bearing rotatably supporting the drive pinion shaft, thereby allowing a shortening of an entire length of the torque transmission coupling.

10 Claims, 13 Drawing Sheets

TORQUE TRANSMISSION APPARATUS AND CASE STRUCTURE

REFERENCE TO RELATED APPLICATION

This is a divisional application and hereby incorporates by reference the entire disclosure of application Ser. No. 10/952,697, filed Sep. 29, 2004, now Allowed.

BACKGROUND OF THE INVENTION

1. Field of the Invention

The present invention relates to a torque transmission apparatus and a case structure of a motor vehicle.

2. Description of the Related Art

An example of a torque transmission apparatus is disclosed in Japanese Patent Application Laid-Open No. 11-153159. The torque transmission apparatus includes a torque transmission coupling. In the torque transmission coupling, if a torque is input to a flange member from a propeller shaft, the torque is transmitted to a shaft through a coupling case in the case that a clutch is engaged on the basis of an operation of an electromagnet. The torque is transmitted to right and left rear wheels via a drive pinion shaft and a rear differential serving as a torque transmission mechanism from the shaft. In the case that the clutch is not engaged, the torque is not transmitted from the propeller shaft to the drive pinion shaft. In other words, it is possible to control the torque transmission from the propeller shaft to the drive pinion shaft by controlling electrify the electromagnet.

However, in the torque transmission apparatus, the electromagnet, the clutch and the like are arranged longitudinally in a direction along a rotating axis with respect to a taper roller bearing supporting the drive pinion shaft to a differential carrier.

According to the torque transmission coupling is such that an input side of the differential serving as the torque transmission mechanism is provided with a clutch mechanism. This arrangement results from separating a design section of the differential from a design section of the clutch mechanism in a company. Namely, a design of the clutch mechanism is later added and adapted to a design of the differential, so that there is no idea that a space involved with the differential and the clutch mechanism including, for example, a carrier to support a rotating member is utilized effectively.

Accordingly, a influence of the result is such that in the case of mounting the torque transmission coupling to an input side of the rear differential or an output side of a transfer, it is necessary to make the propeller shaft shorter at a length. Therefore, the entire length of the torque transmission coupling is increased, and a mounting angle of the propeller shaft becomes to be large, so that there is a risk that a rotational vibration or the like is caused.

An another influence is such that a structure for sectioning holders to hold the differential and the clutch mechanism respectively is complicated and enlarged. A still another influence is such that a volumetric capacity of the clutch mechanism is increased to interfere the clutch mechanism with a vicinity structures such as the propeller shaft or a chassis of a motor vehicle.

SUMMARY OF THE INVENTION

An object of the present invention is to provide a torque transmission apparatus and a case structure, capable of being compacted systematically.

To achieve the object, there is provided a torque transmission apparatus has input and output rotating members for carrying out input and output transmission of a torque, and a torque control mechanism for controlling a torque transmission between the input and output rotating members. At least a part of the torque control mechanism is arranged in an outer periphery of one or more bearings rotatably supporting one of the input and output rotating members.

Accordingly, the bearings and at least a part of the torque control mechanism are overlapped, whereby it is possible to use at least a part of occupied volumetric capacities of both elements in common, and it is possible to securely shorten the entire length at that degree.

The torque transmission apparatus has the torque control mechanism comprises an connection and disconnection portion and an actuator operating the connection and disconnection portion.

Accordingly, it is possible to use at least a part of the occupied volumetric capacities in common by arranging at least a part of the connection and disconnection portion having an connection and disconnection function and the actuator operating the connection and disconnection portion in an outer periphery of the bearings.

The torque transmission apparatus provides with the connection and disconnection portion between the inner and outer rotating members independently working with the input and output rotating members to arrange at least a part of the connection and disconnection portion in the outer periphery of the bearings. A fastening means is tightened to one of the input and output rotating members to fasten the inner rotating member and the bearings. At least a part of the actuator is arranged in the outer periphery of the fastening means.

Accordingly, it is possible to use at least a part of the occupied volumetric capacities of the fastening means and the actuator in common. Therefore, it is possible to securely shorten the entire length while fastening and fixing the inner rotating member to one of the input and output rotating members and applying the preload to the bearings.

The torque transmission apparatus provides with the connection and disconnection portion between the inner and outer rotating members independently working with the input and output rotating members. A fastening means is tightened to one of the input and output rotating members to apply a preload to the bearings. At least a part of the connection and disconnection portion or the actuator is arranged in the outer periphery of the bearings and the fastening means.

Accordingly, it is possible to use at least a part of the occupied volumetric capacities of the connection and disconnection portion or the actuator and the bearings and the fastening means in common while fastening the bearings to apply the preload to the bearings. It is possible to securely shorten the entire length.

The torque transmission apparatus provides with a fastening means to be tightened with an end portion of one of the input and output rotating members in a penetrating state to apply a preload to the bearings. One of the inner and outer rotating members is engaged with the end portion.

Accordingly, it is possible to use at least a part of the occupied volumetric capacities of the bearings, the fastening means, and the connection and disconnection portion, and it is possible to securely shorten the entire length. Further, it is possible to easy attach and detach the connection and disconnection portion on the basis of, for example, a sub assembly.

The torque transmission apparatus provides with an oil space between the end portion and the other of the input and output rotating members, capable of reserving oil for being supplied to the connection and disconnection portion.

Accordingly, it is possible to securely achieve lubrication and cooling in a side of the connection and disconnection portion by the oil in the oil space.

The torque transmission apparatus supports one of the input and output rotating members to a first carrier portion by the bearings. The first carrier portion is provided with a second carrier portion which covers a periphery of the bearings and is sectioned with respect to the first carrier portion. The torque control mechanism is arranged within the second carrier portion.

Accordingly, it is possible to inhibit a pressure increase by the space volumetric capacity obtained by the second carrier portion even if a pressure within the second carrier portion ascends on the basis of a heat generation at the torque control mechanism.

The torque transmission apparatus supports one of the input and output rotating members to the first carrier portion with a pair of the bearings are placed at an interval. A seal is provided between the bearings.

Accordingly, it is possible to easily place the seal while securely sectioning an insides of the first carrier and the second carrier and properly using a different kind of oil. Further, it is possible to securely support one of the input and output rotating members by the bearings placed at the interval.

The torque transmission apparatus provides the second carrier portion with a detachable filler plug for supplying the oil lubricating the torque control mechanism, and a detachable drain plug for discharging the oil therefrom.

Accordingly, it is possible to easily replace the oil and it is possible to improve a durability of the apparatus.

The torque transmission apparatus receives one of the input and output rotating members and the torque control mechanism within the carrier. The carrier comprises a first carrier portion receiving the bearings in an inner peripheral side, a second carrier portion receiving the torque control mechanism in an inner peripheral side, and a third carrier portion receiving a drive device interlocking to one of the input and output rotating members in an inner peripheral side. The first carrier portion or the second carrier portion is detachable with respect to the third carrier portion.

Accordingly, the first carrier portion can be divided while taking into consideration a supported state of one of the input and output rotating members by the bearings and an outer shape thereof, and an assembling procedure. The second carrier portion can be formed while taking into consideration a supported state of the torque control mechanism, an outer shape and an assembling procedure thereof. Therefore, it is possible to easily establish a layout of the torque transmission apparatus.

The torque transmission apparatus provides the carrier with a detachable fourth carrier portion for assembling the torque control mechanism in an inner peripheral side of the second carrier portion along an axial direction.

Accordingly, it is possible to assemble the torque control mechanism in the inner peripheral side of the second carrier portion along the axial direction in a state in which the fourth carrier portion is detached. Therefore, it is possible to easily establish the layout of the torque transmission apparatus.

The torque transmission apparatus provides with the connection and disconnection portion being constituted by a frictional engagement portion for controlling a torque transmission between the input and output rotating members in response to a fastening force.

Accordingly, a torque control mechanism is generally elongated in the axial direction by increasing a number of clutch plates to increase a transmission torque capacity. According to the torque transmission apparatus, however, the entire length can be securely shortened by effectively using the occupied volumetric capacity with the bearings in common.

The torque transmission apparatus provides with the actuator being constituted by an annular electric motor arranged in an outer peripheral side of the bearings.

Accordingly, an operating force is improved on the basis of a reduction in size of the torque control mechanism in the axial direction and an increase in the capacity of the electric motor, thereby an operation response is also improved.

The torque transmission apparatus is provided with the torque control mechanism comprises: a frictional engagement portion provided between sand input and output rotating members and controlling a transmission torque between the input and output rotating members; a compression gear set having a pair of gears, a planetary gear engaging with the pair of the gears and a planetary carrier supporting the planetary gear, wherein any one of the pair of gears, the planetary gear and the planetary carrier is supported in a non-rotatable manner, any other one of them is driven in a rotatable manner, and the others are relatively rotated, whereby an input generated by the rotational drive is converted into a compression force in a direction along a rotating axis so as to frictionally engage the frictional engagement portion; and an actuator executing the rotational drive, wherein gear ratios or engagement radii between the pair of individual gears and the planetary gear are set to be different from each other in order to execute the relative rotation, and at least a part of the frictional engagement portion or the actuator is arranged in an outer periphery of the bearings.

Accordingly, if the rotational drive is executed by the actuator, it is possible to relatively rotate a pair of gears at a low speed on the basis of the difference in the gear ratios or the engagement radii between the pair of individual gears and the planetary gear. Alternatively, it is possible to relatively rotate one of a pair of gears and the planetary carrier at a low speed on the basis of the difference in the gear ratios or the engagement radii between the pair of individual gears and the planetary gear. It is possible to convert the input generated by the rotational drive into the compression force in the direction along the rotating axis on the basis of the relative rotation at the low speed so as to frictionally engage the frictional engagement portion.

That is, the pair of gears and the planetary gear engaging with the gears is provided, the gear ratios or the engagement radii between the pair of individual gears and the planetary gear are set to be different from each other, and the rotational drive of the actuator is much decelerated and is converted into the compression force, thereby enabling to miniaturize the decelerating mechanism and the actuator, and form general compact.

Accordingly, it can be easily arranged within the narrow space. Further, since the actuator can be miniaturized, it is possible to achieve a weight reduction. Further, since the rotational drive of the actuator is much decelerated and is converted into the compression force, it is possible to easily execute a fine adjustment of the frictional engagement of the frictional engagement portion.

In addition, since the frictional engagement portion or the actuator is arranged in the outer peripheral side of the bearings rotatably supporting one of the input and output rotating members, it enables effectively utilize an internal space to be compacted systematically of the apparatus while, for example, providing with a pair of bearings increasing a span therebetween to securely support one of the input and output rotating members.

The torque transmission apparatus provides a supporting part of a carrier for supporting the bearings with an oil passage to introduce a lubricating oil to the bearings.

Accordingly, it is possible to securely lubricate the bearings.

A torque transmission apparatus is arranged in any one of an output side of a transfer and an input side to a rear differential of a four wheel drive vehicle.

Accordingly, it is possible to elongate a propeller shaft at an amount at which an entire length becomes shorter so as to reduce a mounting angle thereof. Therefore, it is possible to inhibit the generation of the rotational vibration or the like.

To achieve the object, there is provided a case structure, wherein a partition wall sectioning between the case main body and the case cover is provided, the partition wall is provided with a support portion rotationally supporting the rotation member, and an internal space is provided in an outer periphery of the support portion to be formed in a closed cross sectional structure in both of inner and outer peripheries and be opened toward the case cover.

Accordingly, it is possible to effectively form the internal space without setting the outer periphery of the support portion to an external space.

Further, since the internal space, the support portion, and a part of the case cover are overlapped in a radial direction, it is possible to inhibit the entire length from being elongated while forming the internal space.

Further, it is possible to increase the space capacity in a side of the case cover on the basis of the internal space to improve a heat radiating performance in a side of the second torque transmission mechanism. Therefore, it is possible to inhibit a function property reduction caused by a temperature increase of the second torque transmission mechanism.

The case structure has the internal space formed in a cylindrical shape.

Accordingly, the case structure can be formed as a double structure in the inner and outer peripheries of the internal space, and it is possible to improve strength of the case while realizing a lightweight.

The case structure sets the connection portion to be positioned close to the case main body rather than a leading end portion of the support portion.

Accordingly, the support portion can be protruded with respect to the case main body at a time of assembling to improve an assembling property of the rotating member with respect to the support portion.

The case structure provides the partition wall with a recess portion bulging to the case main body side to enlarge the internal space.

Accordingly, it is possible to further enlarge the capacity within the case cover by the recess portion.

The case structure has the first torque transmission mechanism is constituted by a differential, the second torque transmission mechanism is constituted by a torque control mechanism for transmitting an input torque, and the rotation member is constituted by a pinion shaft for transmitting a torque from the torque control mechanism to the differential.

Accordingly, it is possible to inhibit the transmission torque property of the torque control mechanism from being lowered on the basis of an improvement of the heat radiating property.

The case structure has the first torque transmission mechanism is constituted by a transfer apparatus, the second torque transmission mechanism is constituted by a torque control mechanism for transmitting an output torque, and the rotation member is constituted by an output shaft for transmitting a torque from the transfer apparatus to the torque control mechanism.

Accordingly, it is possible to inhibit the transmission torque property of the torque control mechanism from being lowered on the basis of an improvement of the heat radiating property.

To achieve the object, there is provided a torque transmission apparatus comprising: input and output rotating members for carrying out input and output transmission of a torque; a torque control mechanism for controlling a torque transmission between the input and output members; a torque transmission mechanism arranged at an opposite side of the one of the input and output members against the torque control mechanism in a direction along the rotating axis; a carrier receiving the torque control mechanism and the torque transmission mechanism; one or more bearings rotatably supporting the one of the input and output rotating members; wherein at least a part of which being involved in the torque control mechanism is arranged to overlap to the one of the input and output rotating members in a radial direction.

Accordingly, a design of the torque transmission mechanism side and a design of the torque control mechanism are joined to be carried out, so that it is possible to use occupied volumetric capacities in common. Therefore, useless spaces can be reduced, it is possible to improve a efficiency of arranging spaces as a whole. Namely, the torque transmission apparatus can be compacted systematically.

The torque transmission apparatus provided with a seal between a pair of bearings rotatably supporting the input and output rotating members, for sealing between a space of the torque control mechanism side and a space of the torque transmission mechanism side of the carrier.

Accordingly, it is possible to arrange the seal without making much modification of the torque control mechanism. Thus, useless spaces is prevent to be generated.

The torque transmission apparatus arranges a part of the torque control mechanism in an outer periphery of the bearings.

Accordingly, the torque transmission apparatus can be shortened in a direction along the rotating axis systematically.

The torque transmission apparatus arranges a partition wall sectioning between the spaces of the torque control mechanism and the torque transmission mechanism to be closed to the torque transmission mechanism, wherein the space of the torque control mechanism side is enlarged in an outer periphery of a supporting part of carrier for supporting the bearings.

Accordingly, a volumetric capacity within the carrier can be enlarged in the direction along the rotating axis to prevent this apparatus from being enlarged in the radial direction. It does not need to take into consideration interference with vicinity structures.

In addition, the enlargement of the volumetric capacity enables to securely carry out a heat radiation of a head generated at the torque control mechanism, so that a torque transmission property can be stabilized.

The torque transmission apparatus forms a space for receiving the torque control mechanism by the supporting part of the carrier for supporting the bearings, a part of the carrier arranged in an outer periphery of the supporting part, and the partition wall closed to the torque transmission mechanism in a cylindrical shape.

Accordingly, the space for receiving the torque control mechanism are taken as a large space, so that a heat radiating property or cooling property is improved.

In addition, the carrier can be provided with a double structure in the inner and outer peripheries of the internal space, and it is possible to improve strength of the case while realizing a lightweight.

DESCRIPTION OF THE PREFERRED EMBODIMENTS

Figure 1:
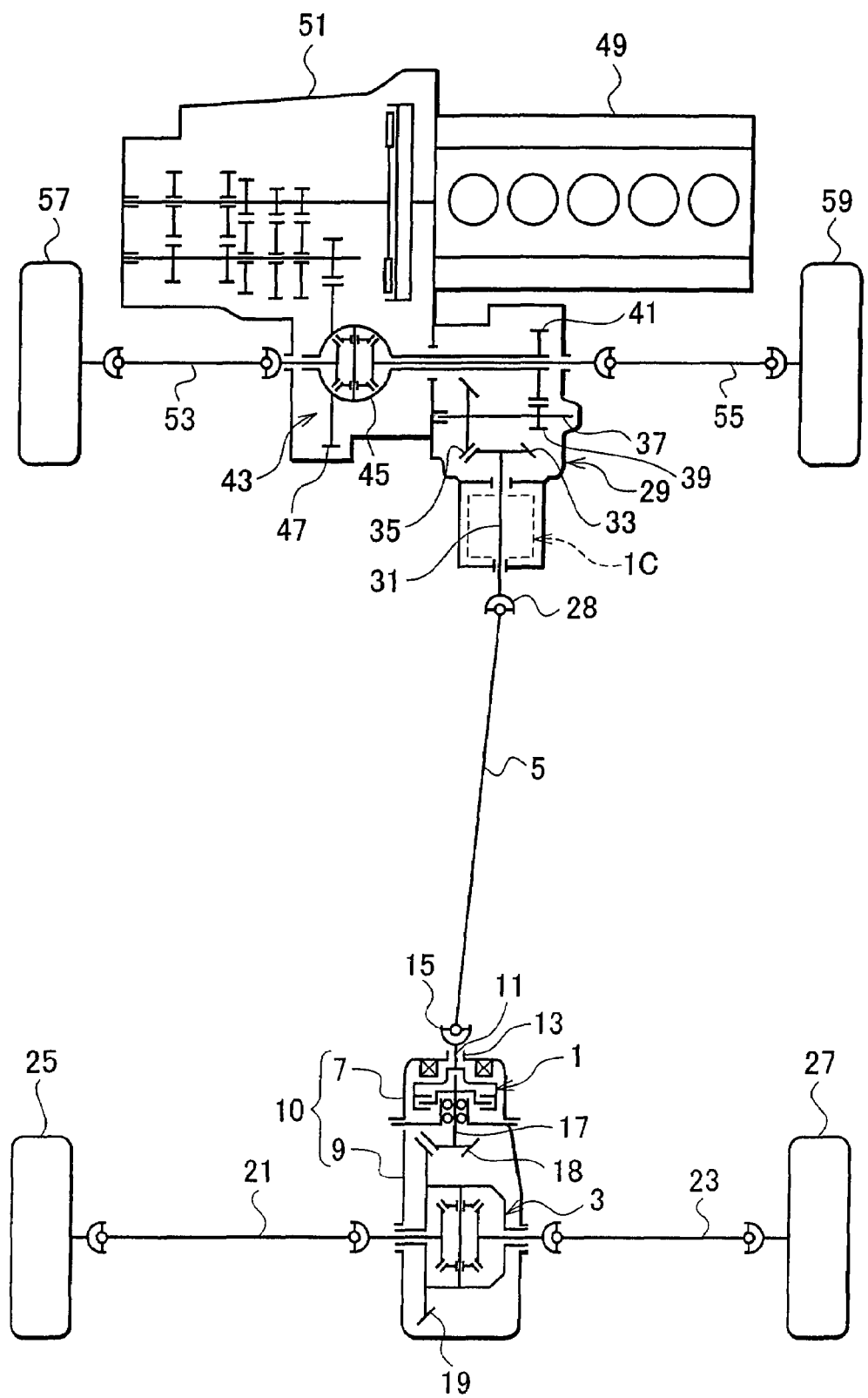
FIG. 1 is a skeleton plan view of a four wheel drive vehicle showing an arrangement of a torque transmission apparatus according to a first embodiment.
Figure 2:
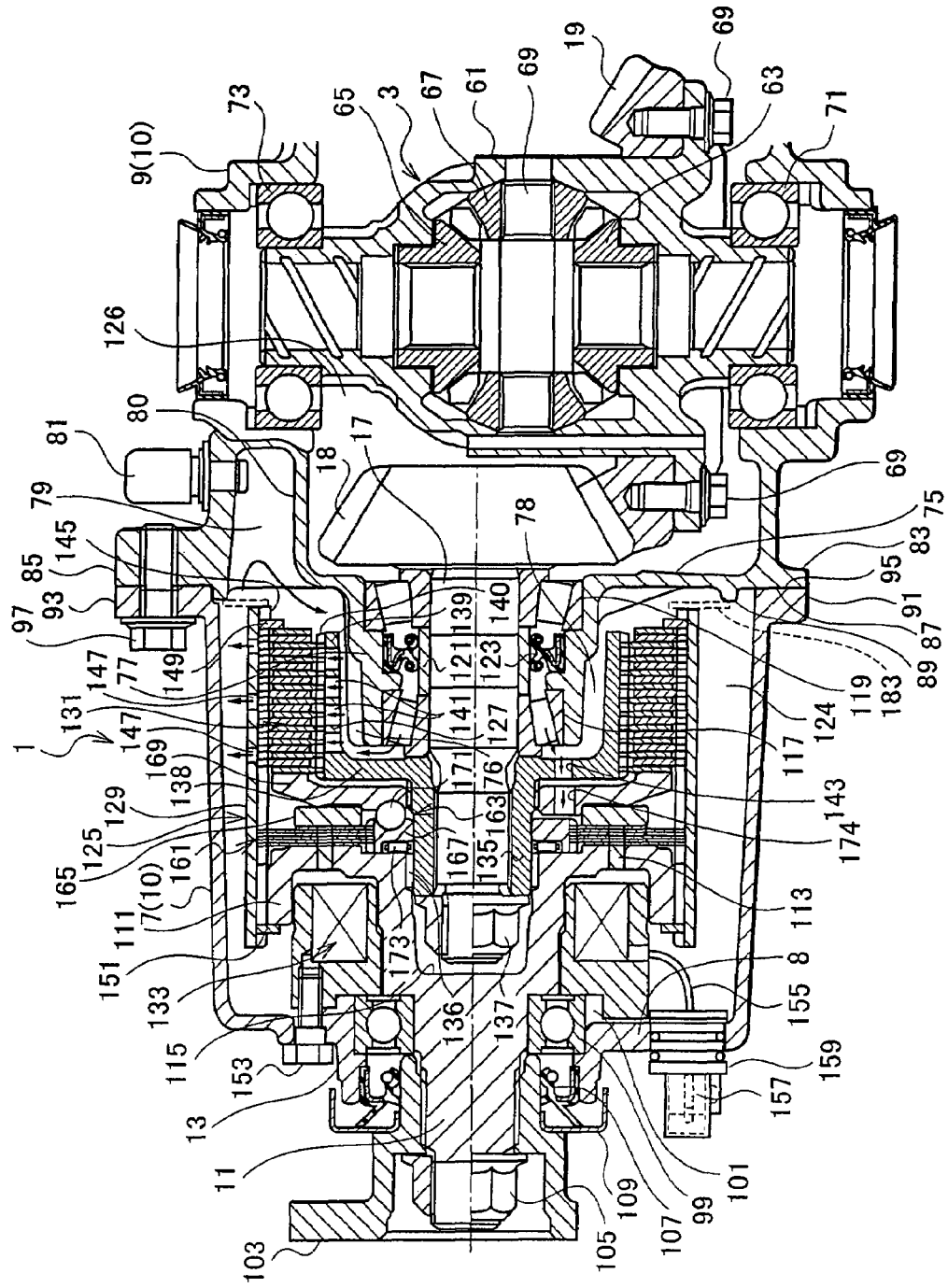
FIG. 2 is an enlarged cross sectional view showing a mounting state of the torque transmission apparatus according to the first embodiment, in which an approximately upper left half shows an enlarged vertical cross sectional view, and the other shows an enlarged horizontal cross sectional view.
Figure 3:
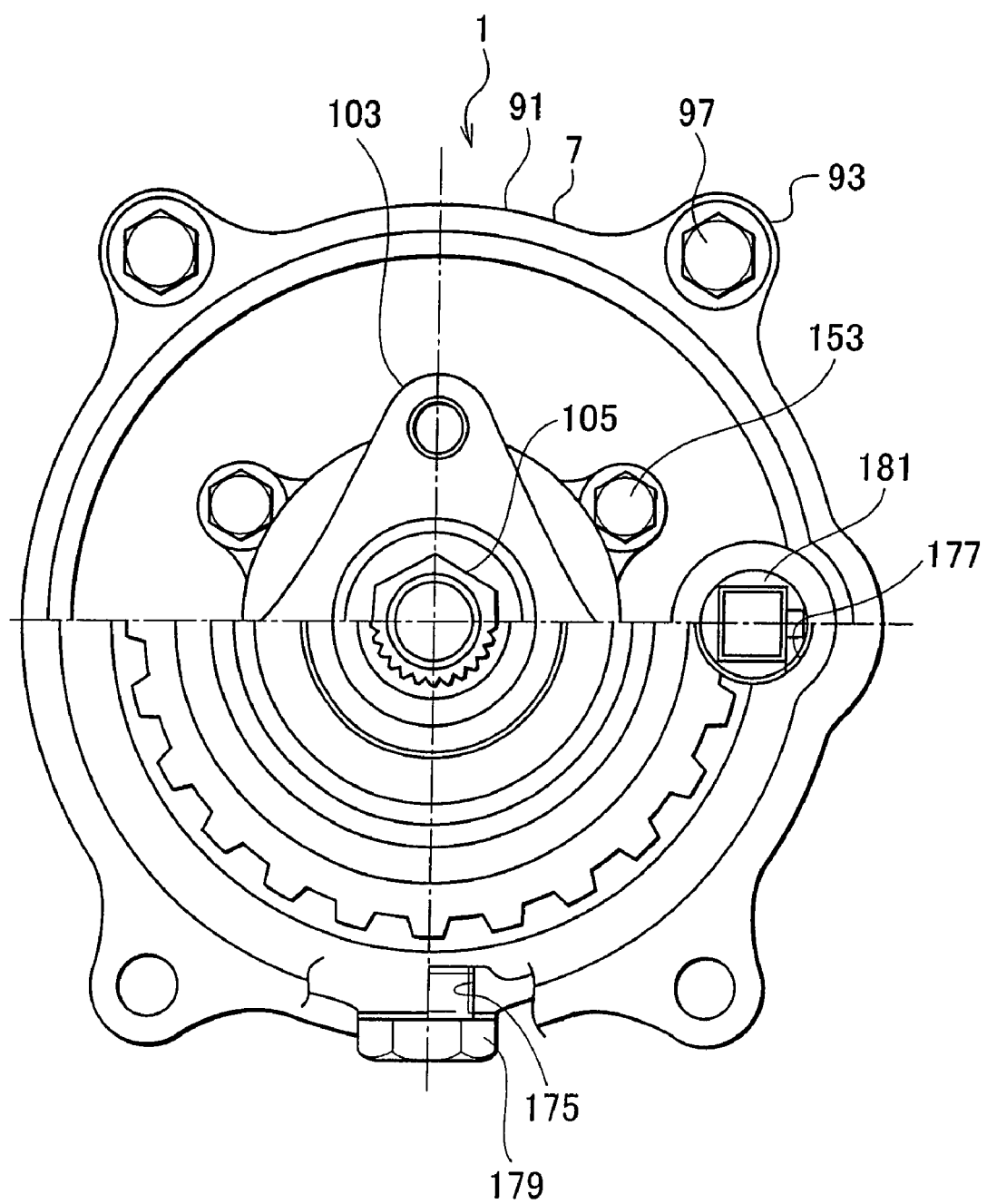
FIG. 3 is a side elevational view showing a part of the torque transmission apparatus by a cross section according to the first embodiment.

FIGS. 1 to 3 show a first embodiment of the torque transmission apparatus according to the present invention, in which FIG. 1 is a skeleton plan view of a four wheel drive vehicle showing an arrangement of a torque transmission apparatus, FIG. 2 is an enlarged cross sectional view showing a mounting state of the torque transmission apparatus, in which an approximately upper left half shows an enlarged vertical cross sectional view, and the other shows an enlarged horizontal cross sectional view, and FIG. 3 is a side elevational view showing a part of the torque transmission apparatus by a cross section.

As shown in FIG. 1, a torque transmission coupling 1 serving as a torque control mechanism constitutes a second torque transmission mechanism is arranged between a rear differential 3 and a propeller shaft 5 in a four wheel drive vehicle of a transverse front engine and front wheel drive base (FF base).

The torque transmission coupling 1 is arranged within a carrier cover 7 serving as a second carrier portion constitutes a case cover. Accordingly, the structure is such that the torque control mechanism is received in the case cover. The divided carrier cover 7 is mounted to a differential carrier 9 serving as a third carrier portion constitutes a case main body to form a carrier 10 together with the differential carrier 9 including a first carrier portion mentioned below.

The torque transmission coupling 1 has a rotating shaft 11 constitutes a part of an outer rotating member in one end. The rotating shaft 11 protrudes from a boss portion 13 in one end of the carrier cover 7 and is coupled to a universal joint 15 serving as another of the input and output members. The torque transmission coupling 1 has a drive pinion shaft 17 serving as one of the input and output members in another end side is interlocked to the rear differential 3 serving as a first torque transmission mechanism constitutes a drive device. The rear differential 3 is arranged within the differential carrier 9. Namely, the drive pinion shaft 17 can transmit a torque between the first and second torque transmission mechanisms. In the present embodiment, the rotating shaft 11 constitutes an input rotating member, the drive pinion shaft 17 constitutes an output rotating member, respectively. The drive pinion shaft 17 is provided with a drive pinion gear 18 serving as a power transmission gear.

The rear differential 3 is rotatably supported to the differential carrier 9. Accordingly, the first torque transmission mechanism is received in the case main body side. The rear differential 3 has a ring gear 19. The ring gear 19 is engaged with the drive pinion gear 18. The rear differential 3 is connected to left and right rear wheels 25 and 27 with left and right axle shafts 21 and 23 in an interlocking manner.

The rotating shaft 11 is connected to the propeller shaft 5 through the universal joint 15. The propeller shaft 5 is interlocked to an output shaft 31 of a transfer 29 through a universal joint 28. The output shaft 31 is structured such as to work with bevel gears 33 and 35, a transmission shaft 37 and spur gears 39 and 41 within the transfer 29. The spur gear 41 is structured such as to work with a differential case 45 of a front differential 43.

The front differential 43 has a ring gear 47. The structure is made such that an output of an engine 49 serving as one of prime movers constitutes an internal combustion engine is input to the ring gear 47 thorough a transmission 51. The front differential 43 is connected to left and right front wheels 57 and 59 with left and right axle shafts 53 and 55 in an interlocking manner.

Accordingly, the output torque of the engine 49 is transmitted to the front differential 43 through the transmission 51 and the ring gear 47. The output torque is transmitted to the left and right front wheels 57 and 59 from the front differential 43 through the left and right axle shafts 53 and 55.

Further, the torque is transmitted to the propeller shaft 5 from the differential case 45 of the front differential 43 through the spur gears 41 and 39, the transmission shaft 37, the bevel gears 35 and 33 and the output shaft 31 of the transfer. The torque is transmitted to the rotating shaft 11 of the torque transmission coupling 1 from the propeller shaft 5.

If the torque transmission coupling 1 is in a torque transmissible state, the torque is transmitted to the ring gear 19 of the rear differential 3 through the drive pinion shaft 17 and the drive pinion gear 18. The torque is transmitted to the left and right rear wheels 25 and 27 from the rear differential 3 through the left and right axle shafts 21 and 23.

Accordingly, if the torque transmission coupling 1 is controlled in the torque transmissible state, the vehicle can run in a four wheel drive state with the left and right front wheels 57 and 59 and the left and right rear wheels 25 and 27. In this case, the "controlled in the torque transmissible state" means that the torque transmission coupling 1 is set to a connection state, in the case that the torque transmission coupling 1 has the connection state and a disconnection state as at least two torque transmission functions. Further, the connection state may be constituted by one torque transmission value or a plurality of torque transmission values (that is, an intermediate control).

In the case that the torque transmission coupling 1 is in the torque disconnection state, the torque is not transmitted to the left and right rear wheels 25 and 27. Thus, the vehicle can run in a two-wheel drive state on the basis of the torque transmission to the left and right front wheels 57 and 59.

Details of the carrier case 10, and the torque transmission coupling 1, the rear differential 3 and the peripheral elements supported by the carrier case 10 are as shown in FIGS. 2 and 3.

The rear differential 3 receiving the torque input from the torque transmission coupling 1 is provided with left and right side gears 63 and 65 and a pinion gear 67 within the differential case 61. The side gears 63 and 65 and the pinion gear 67 are engaged with each other. The pinion gear 67 is rotatably supported to the differential case 61 by the pinion shaft 69. The differential may constitute the first torque transmission mechanism to make a relative rotation between the left and right wheels without gears, or to make a correspondence rotation between the left and right wheels, to connect and disconnect the left and right individual wheels respectively, or the like.

The ring gear 19 is attached and fixed to the differential case 61 by a bolt 69. The differential case 61 is rotatably supported to the differential carrier 9 by ball bearings 71 and 73. A partition wall 75 is integrally formed in one side of the differential carrier 9. Namely, the partition wall 75 is provided between the differential carrier 9 of the carrier case 10 and the carrier cover 7.

The partition wall 75 is integrally provided with a bearing housing portion 77 serving as the first carrier portion constitutes the support portion. The bearing housing portion 77 protrudes to an interior of the carrier cover 7. The partition wall 75 may be included in the first carrier portion. The bearing housing portion 77 is formed in a cylindrical shape, for example, in a stepped taper shape in which a leading end portion is slightly smaller in diameter than a base end portion. An oil guide groove 76 is provided in an upper surface of the bearing housing portion 77. The oil guide groove 76 extends along an entire length of the bearing housing portion 77 in an axial direction.

An interior space 78 is provided in an outer periphery of the bearing housing portion 77. The inner space 78 is surrounded by the bearing housing portion 77, the carrier cover 7 and the partition wall 75, and is open to an inner side of the carrier cover 7 in a side of the propeller shaft 5.

The carrier cover 7 is formed in a cylindrical shape having a circumferentially depressed portion, for example, in a taper shape in which a leading end portion is slightly smaller in diameter than a base end portion, and covers an outer side of the bearing housing portion 77. Accordingly, the interior space 78 is formed in a cylindrical shape, for example, in an approximately cylindrical shape having a slight taper on the basis of the shape of the carrier cover 7.

A recess portion 79 is provided partly in a peripheral direction in an upper portion or the like of the partition wall 75. The recess portion 79 may be provided in a circumferential shape. The recess portion 79 is open to a side of the carrier cover 7. Accordingly, the recess portion 79 is continuously provided in the internal space 78 to enlarge the internal space 78. A bottom portion 80 of the recess portion 79 is formed to be slightly downward inclined to a side of the internal space 78. A breather 81 is mounted to an upper portion in the innermost side of the recess portion 79.

The differential carrier 9 is provided with a striking flange 83 and coupling protruding portion 85 serving as a connection portion in an outer periphery in a side of the partition wall 75. The flange 83 is provided in a circumferential shape, and the protruding portion 85 is provided at a plurality of positions, for example, four positions at a predetermined interval. A mating face 87 is provided in end surfaces of the flange 83 and the protruding portion 85. The mating face 87 is positioned close to the differential carrier 9 rather than a leading end portion of the bearing housing portion 77, and a position thereof in an axial direction is set in correspondence to the base portion of the bearing housing portion 77. A spacer supporting protruding portion 89 is provided in a circumferential shape in the partition wall 75 in an inner peripheral side of the mating face 87 in a radial direction.

The carrier cover 7 is provided with the boss portion 13 in one end side, and is provided with a flange 91 and a coupling protruding portion 93 serving as the striking connection portion in another end side. The flange 91 is provided in a circumferential shape, and the protruding portion 93 is provided, for example, at four positions in a circumferential direction in correspondence to the protruding portion 85 of the differential carrier 9. A mating face 95 is provided in end surfaces of the flange 91 and the protruding portion 93. A end wall 8 between the carrier cover 7 and the boss portion 13 is integrally formed in a outer peripheral tube portion 12 of the carrier cover 7.

The carrier cover 7 is mounted in a state in which the mating face 95 thereof is struck against the mating face 87 of the differential carrier 9 interposed a liquid-type gasket or a plate-type gasket having a predetermined thickness, and the protruding portion 93 is fastened to the protruding portion 85 of the carrier 9 by a bolt 97. The position of the mating face 95 may be provided in an outer peripheral side of the end wall 8 by extending the differential carrier 9 to the side of the end wall 8 of the carrier cover 7.

An inner side of the carrier cover 7 is communicated with the recess portion 79 of the differential carrier 9, whereby a ventilation with the external portion can be achieved through the breather 81. The carrier cover 7 covers a periphery of the bearing housing portion 77, that is, a periphery of a bearing mentioned below. The carrier cover 7 is sectioned with respect to the differential carrier 9.

The rotating shaft 11 is rotatably supported to the boss portion 13 of the carrier cover 7 through a seal bearing 99. The carrier cover 7 is provided with a cut 101 in an outer periphery of the seal bearing 99. A flange member 103 is mounted to an outer end portion of the rotating shaft 11 by a spline engagement. The flange member 103 is fixed to the rotating shaft 11 by a nut 105. A seal 107 is provided between the flange member 103 and the boss portion 13 of the carrier cover 7, and closely seals an interior space of the carrier cover 7. The oil within the carrier cover 7 circulates in the seal 107 through the cut 101. An outer side of the seal 107 is covered by a dust cover 109. The dust cover 109 is fixed to the flange member 103.

A magnetic rotor 111 is made from, for example, a steel group metal, and is integrally provided to an inner end portion of the rotating shaft 11. A nonmagnetic ring 113 is made from, for example, a stainless group metal, and is integrally provided in the magnetic rotor 111 in a circumferential shape by, for example, welding. A recess portion 115 is provided on an end surface of the rotating shaft 11 in an inner peripheral side of the magnetic rotor 111.

The drive pinion shaft 17 is rotatably supported to the bearing housing portion 77 by a pair of taper roller bearings 117 and 119. The taper roller bearings 117 and 119 are arranged at an interval. The taper roller bearings serve as a bearing constituting a support portion together with the outer bearing housing portion 77. A seal slide ring 121 is provided between the taper roller bearings 117 and 119. An oil seal 123 is provided between the seal slide ring 121 and the bearing housing portion 77 as a seal for sectioning, between the taper roller bearings 117 and 119. The interior of the carrier cover 7 is sectioned with respect to a interior space of the differential carrier 9 through the bearing housing portion 77 with the oil seal 123 and the partition wall 75, whereby a coupling space 124 and a differential gear space 126 are formed. An oil suitable for the coupling 1, for example, transmission fluid, automatic transmission fluid or the like is received as a lubricant in the coupling space 124, and an oil, for example, a gear oil is received as a lubricant in the differential gear space 126. The other oil may be charged such that a unique lubricating environment is formed in the interior of the torque transmission coupling 1 as in the conventional structure. In this case, the oil seal 123 can separate the interior space of the carrier into a space of the torque transmission coupling 1 side and a space the rear differential 3 side. The separated spaces are supplied with proper oil or air respectively.

The torque transmission coupling 1 is provided with a torque control part 125 in addition to the rotating shaft 11 and the drive pinion shaft 17. The torque control part 125 is received into the carrier cover 7. The torque control part 125 is mainly provided with a clutch hub 127, a coupling case 129, a main clutch 131 serving as one example of a connection and disconnection portion, and an electromagnet 133 serving as an actuator.

The clutch hub 127 and the coupling case 129 constitutes an inner rotating member and an outer rotating member, respectively. The main clutch 131 structures a connection and disconnection portion transmitting the torque between the clutch hub 127 and the coupling case 129 on the basis of a fastening force caused by an electromagnetic force. According to present embodiment, the mail clutch 131 consists of a frictional multiplate clutch serving as a frictional engagement portion.

The clutch hub 127 has a small-diameter portion 135 and a large-diameter portion 139 to be formed in a stepped cylindrical shape. The clutch hub 127 is engaged the small-diameter portion 135 with the end portion of the drive pinion shaft 17 by a spline fitting to co-rotate with the drive pinion shaft 17. The small-diameter portion 135 has a nature of a nonmagnetic material or a low magnetic material, and is fitted to an inner peripheral surface of the magnetic rotor 111 through a bush 136 preventing to pass through a magnetic force line from the magnetic rotor. Accordingly, the small-diameter portion 135 and the magnetic rotor 111 are rotatably supported to each other.

A nut 137 serving as a fastening means is tightened to the end portion of the drive pinion shaft 17. The small-diameter portion 135 of the clutch hub 127 is fastened to the taper roller bearing 117 by tightening the nut 137. On the basis of the fastening, the clutch hub 127 is fixed to the drive pinion shat 17, and a preload is applied to the taper roller bearings 117 and 119. A gap preventing to passéthrough the magnetic force line is secured between an outer peripheral side of the nut 137 and an inner peripheral surface of the magnetic rotor 11.

The large-diameter portion 139 of the clutch hub 127 is arranged in the outer periphery of the bearing housing portion 77 via a joint portion 138 expanding to an outer side in a radial direction to enter into the inner space 78. Accordingly, the large-diameter portion 139 is overlapped the bearing housing portion 77 in inner and outer sides in a radial direction. The large-diameter portion 139 is provided with a male spline 140 on an outer peripheral surface. Inner plates of the main clutch 131 is spline engaged with the male spline 140 of the large-diameter portion 139. Further, the large-diameter portion 139 is provided with an oil hole 141 penetrating in a radial direction. The oil hole 141 is provided at a plurality of positions in a circumferential direction and at a plurality of positions in a direction along a rotating axis. The clutch hub 127 is provided with an oil hole 143 in a direction along the rotating axis, in an intermediate portion between the small-diameter portion 135 and the large-diameter portion 139, that is, a connection portion 138.

The coupling case 129 is made of, for example, an aluminum pipe material formed in a cylindrical shape. A female spline 145 is provided on an inner peripheral surface of the coupling case 129 by, for example, broach processing. Outer plates of the main clutch 131 is spline engaged with the female spline 145. An oil hole 147 is formed in a penetrating manner in the coupling case 129 in correspondence to the oil hole 141. The oil hole 147 is formed at a plurality of positions in a direction along a rotating axis and a peripheral direction. A pressure receiving stopper 149 is provided in an inner periphery in one end side of the coupling case 129. The pressure receiving stopper 149 receives a pressing force of the main clutch 131.

The magnetic rotor 111 is spline engaged with another end side of the coupling case 129. A stopper 151 is provided in an inner periphery in another end side of the coupling case 129 in adjacent to the magnetic rotor 111 to receive a cam reaction force generated by a cam mechanism 163 mentioned below.

The electromagnet 133 serves as an actuator generating a fastening force for fastening the main clutch 131 serving as the frictional engagement portion. The electromagnet 133 is fixed within the carrier cover 7 by a bolt 153. The electromagnet 133 is positioned at an outer periphery of a nut 137 received within the recess portion 115 to overlap with the nut 137 in a direction along the rotating axis. The electromagnet is arranged with an air gap in a radial direction with respect to the magnetic rotor 111 in inner and outer peripheries. The electromagnet 133 is connected to a connector 157 through a lead wire 155. The connector 157 is supported to the carrier cover 7 with a grommet 159. The electromagnet 133 is controlled to be electrified by the controller connected with the connector 157.

A pilot clutch 161 and a cam mechanism 163 serving as a torque control part 125 (constituting a part of the connection and disconnection portion) together with the main clutch 131 and the like is provided between the magnetic rotor 111 and the main clutch 131.

The pilot clutch 161 has outer plates and inner plates. The outer plates are spline engaged with the female spline 145 formed on the coupling case 129. An armature 165 constituting a part of the connection and disconnection portion is provided in adjacent to the pilot clutch 161. The armature 165 is attracted by a magnetic force of the electromagnet 133 to fasten the pilot clutch 161 to the magnetic rotor 111.

The cam mechanism 163 comprises a cam plate 167, a pressing plate 169 and a cam ball 171. The cam plate 167 is supported to an outer peripheral surface of the small-diameter portion 135 of the clutch hub 127 to be relatively rotatable. A back surface of the cam plate 167 is supported to the magnetic rotor 111 through a needle bearing 173. Inner plates of the pilot clutch 161 are spline engaged with an outer periphery of the cam plate 167.

An outer periphery of the pressing plate 169 is opposed to the end portion of the main clutch 131, and the pressing plate 169 enables to fasten the main clutch 131. The pressing plate 169 is spline engaged with the outer peripheral surface of the small-diameter portion 135 of the clutch hub 127. An oil hole 174 is provided in the pressing plate 169. The oil hole 174 is opposed to the oil hole 143 of the clutch hub 127.

The cam ball 171 is interposed between the cam surfaces of the cam plate 167 and the pressing plate 169.

The carrier cover 7 is provided with a drain port 175 in a bottom portion thereof as shown in FIG. 3. The drain port is provided for discharging the oil from the inner side of the carrier cover 7. A drain plug 179 is detachably mounted to the drain port 175. A filler port 177 is provided in a vertical intermediate portion in the side of the end surface of the carrier cover 7. The filler port 177 is provided for supplying the oil into the carrier cover 7. A filler plug 181 is detachably mounted to the filler port 177.

An assembling procedure of the torque transmission coupling 1 is as follows.

The drive pinion shaft 17 is supported to the bearing housing portion 77 of the differential carrier 9 with a pair of taper roller bearings 117 and 119. At this time, since the bearing housing portion 77 protrudes from the mating face 87 of the differential carrier 9, it is possible to easily achieve the support of the drive pinion shaft 17 to the bearing housing portion 77.

In this state in which the drive pinion shaft 17 is supported, the differential carrier 9 is set such that the rotating axis of the drive pinion shaft 17 is set in the vertical direction.

The clutch hub 127 is spline engaged with the drive pinion shaft 17. The clutch hub 127 is fastened to the taper roller bearing 117 by tightening the nut 137. On the basis of the fastening mentioned above, the clutch hub 127 is fixed, and the preload is applied to the taper roller bearings 117 and 119.

Next, a horseshoe U-shaped spacer 183 (illustrated by a broken line in FIG. 2) is arranged to be mounted on the protruding portion 89 of the differential carrier 9, and the coupling case 129 is arranged from the above to be brought into contact therewith. Under this state, the main clutch 131, the cam mechanism 163, the needle bearing 173, the armature 165 and the pilot clutch 161 are assembled.

Next, the magnetic rotor 111 and the rotating shaft 11 are assembled. Further, after mounting the stopper 151 to the coupling case 129, the spacer 183 is taken out from a horizontal direction.

Next, the carrier cover 7 to which the electromagnet 133 is fixed is assembled. In this assembly, the mating face 95 of the carrier cover 7 is struck against the mating face 87 of the differential carrier 9, and the protruding portion 93 is fastened to the protruding portion 85 by the bolt 97, so that the carrier cover 7 is fixed to the differential carrier 9.

Next, the flange member 103 is mounted to the end portion of the rotating shaft 11 together with the seal 107 and the dust cover 109, and is fastened by the nut 105, whereby the flange member 103 is fixed to the rotating shaft 11.

Next, a description will be given of an operation.

When the electromagnet 133 is not electrified, and the main clutch 131 is not fastened, the torque transmission coupling 1 is not in the torque transmission state. At this time, even if the torque is transmitted to the rotating shaft 11 from the propeller shaft 5, the torque transmitted to the magnetic rotor 111 and the coupling case 129 from the rotating shaft 11 is interrupted by the main clutch 131. Therefore, no torque is transmitted to the drive pinion shaft 17 from the rotating shaft 11. Accordingly, as mentioned above, the two-wheel drive (2WD) can be achieved by the front wheels 57 and 59.

The electromagnet 133 is electrified, a magnetic flux loop is formed among the electromagnet 133, the magnetic rotor 111 and the armature 165 through the air gap between the electromagnet 133 and the magnetic rotor 111, and the armature 165 is attracted to the side of the magnetic rotor 111. On the basis of the attraction, the armature 165 moves to the pilot clutch 161, and the pilot clutch 161 is fastened between the magnetic rotor 111 and the armature 165.

On the basis of the fastening, the torque is transmitted to the cam plate 167 through the magnetic rotor 111, the coupling case 129 and the pilot clutch 161, and the relative rotation is caused between the cam plate 167 and the co-rotating pressing plate 169 with the drive pinion shaft 17 side. On the basis of the relative rotation, the cam ball 171 runs on the cam surfaces of the cam plate 167 and the pressing plate 169. On the basis of the running-on, an interval between the cam plate 167 and the pressing plate 169 is widened, thereby the cam mechanism 163 is operated to generate a thrust (a cam reaction force) is generated.

The thrust is applied to the cam plate 167, and the cam plate 167 is received by the magnetic rotor 111 through the needle bearing 173. Accordingly, the pressing force is applied as the reaction force of the thrust to the pressing plate 169, and the pressing plate 169 fastens the main clutch 131.

On the basis of the fastening, the torque transmitted to the rotating shaft 11, the magnetic rotor 111 and the coupling case 129 is transmitted to the drive pinion shaft 17 through the main clutch 131 and the clutch hub 127. Therefore, it is possible to achieve the four wheel drive (4WD) by the front wheels 57 and 59 and the rear wheels 25 and 27 as mentioned above.

During the running, the oil within the carrier cover 7 passes through the oil hole 141 of the clutch hub 127 from the side of the taper roller bearing 117 on the basis of an application of a centrifugal force to lubricates the main clutch 131. The oil reaches the outer peripheral side through the oil hole 147 of the coupling case 129. The oil reaches the recess portion 79 and the like from the outer peripheral side of the coupling case 129, and is guided by the slope or the like of the bottom portion 80 and the outer peripheral surface of the bearing housing portion 77 to reach the taper roller bearing 117 in the inner periphery thereof. On the basis of the oil circulation mentioned above, the main clutch 131 and the like can be sufficiently lubricated.

Further, the oil passes through the oil holes 143 and 174 to reach the cam mechanism 163 side, and can sufficiently lubricate around the cam mechanism 163 and the pilot clutch 161.

The lubricating oil can be easily supplied into the carrier cover 7 from the filler port 177 by taking out the filler plug 181. When discharging the lubricating oil from the inner side of the carrier cover 7, the oil can be easily discharged from the drain port 175 by taking out the drain plug 179. Accordingly, it is possible to extremely easily change the oil within the carrier cover 7, so that it is possible to improve a durability of the apparatus.

Since the torque transmission coupling 1 is received within the carrier cover 7, and the carrier cover 7 is exposed to the external portion, a heat radiating effect is high, and it is possible to improve a durability of the torque transmission coupling 1.

The generated heat by the main clutch 131, the pilot clutch 161, the electromagnet 133 and the like is sufficiently radiated according to the increase of the space capacity within the carrier cover 7 by the internal space 78, and the heat is transmitted to the carrier cover 7 and the differential carrier 9 to be radiated (exchanged) to the external space or the space of the differential carrier 9. Accordingly, it is possible to inhibit the temperature of the torque transmission coupling 1 itself from being increased. Therefore, it is possible to prevent to decline the torque transmission property on the basis of the heat. According to the present embodiment, it is possible to prevent to decline the torque transmission control property in the present embodiment from being lowered. Namely, it is possible to obtain a proper torque transmission control property.

Since the space capacity within the carrier cover 7 is expanded by the recess portion 79, the space capacity is further increased, and it is possible to securely inhibit the temperature of the torque transmission coupling 1 itself from being increased.

Since the carrier cover 7 is exposed to the external portion, the heat exchange or the like with respect to the external portion can be promoted. Therefore, it is possible to properly and rapidly radiate heat from the space having the large capacity within the carrier cover 7 to the external portion.

When towing a vehicle or the like, the drive pinion shaft 17 is rotated on the basis of the transmission of the rotating force from the rear wheels 25 and 27 with respect to the rotating shaft 11 stopping rotating, and a slide rotation is generated in the main clutch 131 to generate a heat. When the pressure within the carrier cover 7 is increased on the basis of the heat generation, it is possible to inhibit the pressure increase on the basis of the space capacity within the carrier cover 7. Further, since a fixed level or more pressure is drained to the external portion from the breather 81, it is possible to more effectively inhibit the pressure increase within the carrier cover 7, and it is possible to more securely inhibit the problem caused by the pressure increase.

Since the internal space 78, and the bearing housing portion 77 and a part of the carrier cover 7 overlap in the inner and outer sides in the radial direction and use the volumetric capacity of arrangement in common in the axial direction to increase the space capacity within the carrier cover 7, it is possible to inhibit the entire length of the carrier case 10 from being elongated while forming the internal space 78. Alternatively, it is possible to inhibit the size of the carrier case 10 in the radial direction from being enlarged while forming the internal space 78.

Since the internal space 78 is formed in the cylindrical shape, it is possible to set the carrier case 10 to the double structure comprising the bearing housing portion 77 and the carrier cover 7 in the inner and outer peripheries of the internal space 78, and it is possible to improve the strength of the carrier case 10.

The main clutch 131 is structured as a frictional multiplate clutch in which a lot of clutch plates are disposed in the axial direction for improving the capacity of the transmission torque. Since the main clutch 131 is positioned in the outer periphery of the taper roller bearing 117 and the oil seal 123, the electromagnet 133 is positioned in the outer periphery of the nut 137, and the pilot clutch 161 and the cam mechanism 163 are positioned in the outer periphery of the drive pinion shaft 17 between the main clutch 131 and the electromagnet 133, any wasteful space can be hardly generated within the carrier cover 7 on the basis of a large overlap margin and an efficient share of the volumetric capacity of arrangement, it is possible to make the entire structure including the first and second torque transmission mechanism and the case structure compact as a whole and it is possible to achieve a weight saving. Further, a freedom of arranging and doing the layout of the torque transmission coupling 1 is widened.

Since it is possible to make the length between the drive pinion shaft 17 and the rotating shaft 11 in the direction along the rotating axis extremely shorter, or a part of being involved in the torque transmission coupling serving as the second torque transmission mechanism (the frictional multiplate clutch, the actuator, the torque control part 125, the internal space 78, and the seal 123, and the like) can be arranged close to the first torque transmission mechanism to be overlapped with the drive pinion shaft and the taper roller bearings 117 and 119, thereby making the propeller shaft 5 longer at that degree. Therefore, it is possible to make the mounting angle small, and it is possible to inhibit the rotational vibration or the like.

Since the taper roller bearings 117 and 119 are provided in the bearing housing portion 77 at the interval, the oil seal 123 is provided between the taper roller bearings 117 and 119, and the carrier cover 7 covers the periphery of the bearing housing portion 77, no specific placing space for the oil seal 123 is required while the other kind of oil can be used by securely sectioning the differential carrier 9 and the carrier cover 7. Further, it is possible to securely support the drive pinion shaft 17 by the taper roller bearings 117 and 119 arranged at the interval, and it is possible to inhibit the vibration or the like from being generated.

Figure 4:
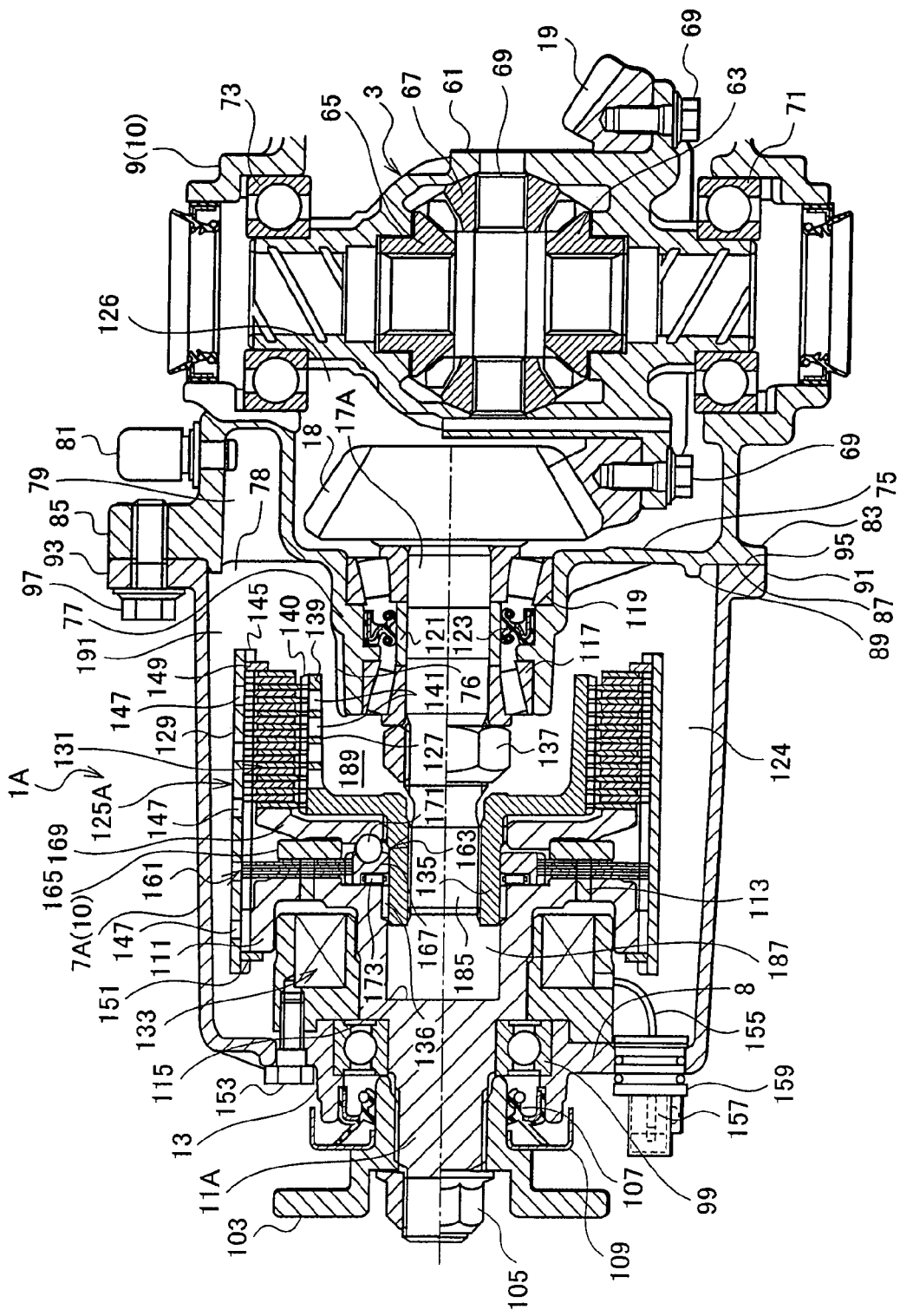
FIG. 4 is an enlarged cross sectional view showing a mounting state of a torque transmission apparatus according to a second embodiment, in which an approximately upper left half shows an enlarged vertical cross sectional view, and the other shows an enlarged horizontal cross sectional view.

FIG. 4 is an enlarged cross sectional view showing a mounting state of a torque transmission apparatus according to a second embodiment, in correspondence to FIG. 2, in which an approximately upper left half shows an enlarged vertical cross sectional view. The same reference numerals or reference numerals obtained by putting A to the same reference numerals are attached to the structure portions in correspondence to the first embodiment.

As shown in FIG. 4, the torque transmission coupling 1A in accordance with the present embodiment is structured such that the nut 137 is tightened to the drive pinion shaft 17A serving as one of the input and output members in a penetrating manner, and the clutch hub 127 serving as the inner rotating member is engaged with an end portion 185 of a drive pinion shaft 17A extending through the nut 137 by a spline fitting co-rotatably.

Further, the present embodiment is provided with the internal space 78 surrounded by the bearing housing portion 77, the carrier cover 7 and the partition wall 75.

The nut 137 applies only the preload of the taper roller bearings 117 and 119 without coupling the clutch hub 127 of the torque control part 125A serving as a part of the torque transmission coupling 1A constitutes the second torque transmission mechanism.

The oil space 187 is provided between the end portion 185 of the drive pinion shaft 17A and a rotating shaft 11A serving as a part of the outer rotating member. Further, a sufficient oil space 189 is formed between the nut 137 and an inner surface of the large-diameter portion 139 of the clutch hub 127. A sufficient oil space 191 is provided between the main clutch 131 and the partition wall 75 of the differential carrier 9.

Accordingly, in the present embodiment, the main clutch 131 is positioned in the outer peripheries of the taper roller bearing 117 and the nut 137, whereby it is possible to make the length in the direction along the rotating axis entirely shorter, and it is possible to achieve approximately the same operations and effects as those of the embodiment 1.

In addition, the nut 137 is tightened to the drive pinion shaft 17A in the penetrating state, and the clutch hub 127 is rotationally engaged with the end portion 185 of the drive pinion shaft 17 extending through the nut 137. It is possible to use the occupied volumetric capacity between the taper roller bearing 117, and the nut 137 and the main clutch 131 in common, and it is possible to securely make the entire length shorter while securing the sufficient oil space 187, 189 and 191.

Further, in the present embodiment, it is possible to securely lubricate the taper roller bearing 117, the main clutch 131, the cam mechanism 163, the pilot clutch 161 and the like by sufficiently securing and enlarging the oil spaces 187, 189 and 191 for reaching to the torque control part 125A serving as the second torque transmission mechanism in the outer periphery of the taper roller bearings 117 and 119.

When assembling, the drive pinion shaft 17A is assembled in a state in which the preload is applied to the taper roller bearings 117 and 119 on the basis of the tightening of the nut 137.

On the other hand, in the side of the carrier cover 7A, the elements are assembled in the order of the electromagnet 133, the rotating shaft 11A and the magnetic rotor 111, the coupling case 129, the pilot clutch 161, the cam mechanism 163, the clutch hub 127, and the main clutch 131 to be sub-assembled. The sub-assembled carrier cover 7A is assembled in the drive pinion shaft 17A, the clutch hub 127 is spline engaged with the end portion 185 of the drive pinion shaft 17A, and the carrier cover 7A is fastened to the differential carrier 9 by the bolt 97. Accordingly, the assembly of the torque transmission coupling 1A with respect to the differential carrier 9 can be completed.

Accordingly, it is possible to extremely easily carry out the assembly, the replacement, the parts control and the like of the main clutch 131, the electromagnet 133, the pilot clutch 161, the cam mechanism 163, the clutch hub 127, the coupling case 129 and the like.

Figure 5:
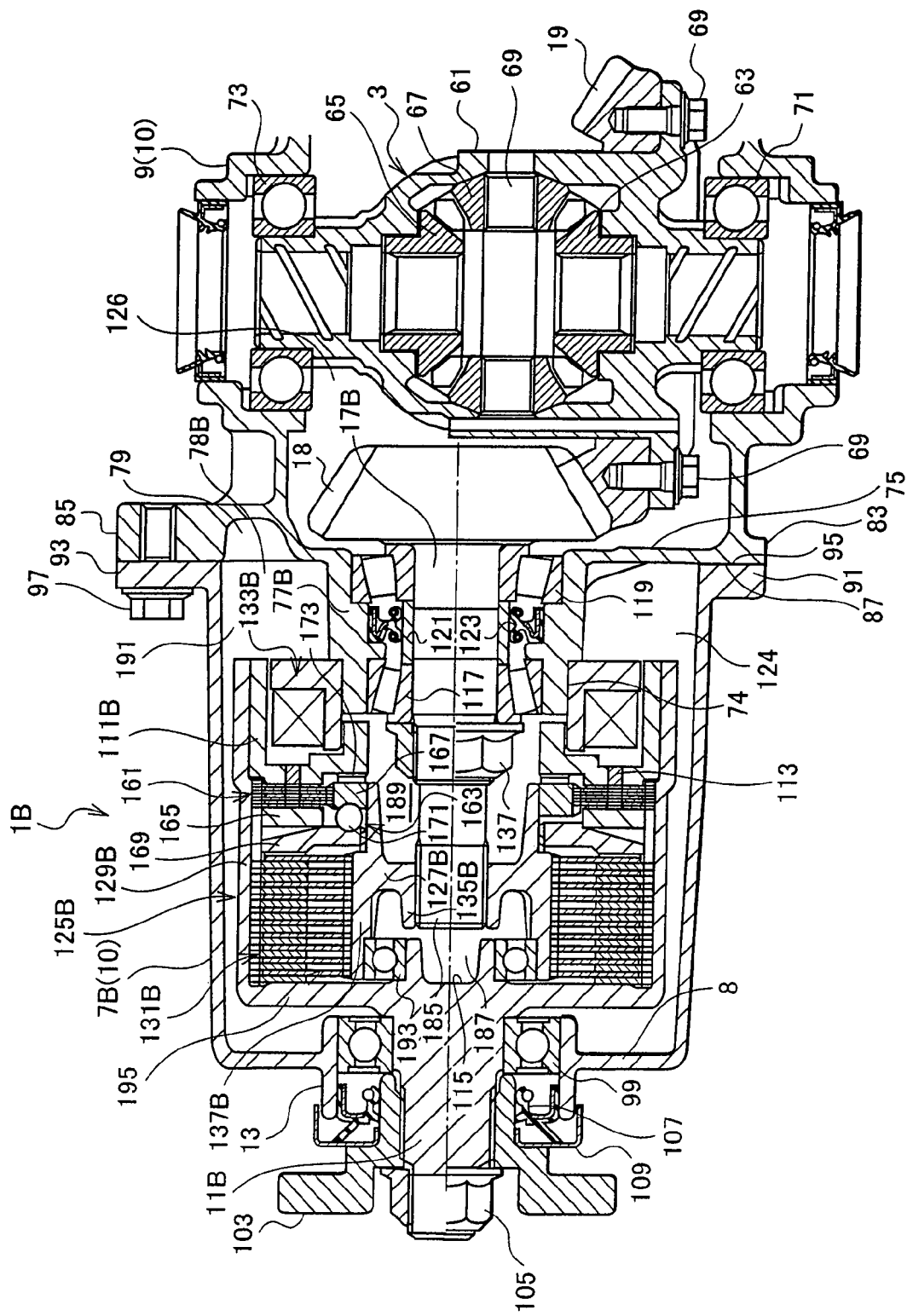
FIG. 5 is an enlarged cross sectional view showing a mounting state of a torque transmission apparatus according to a third embodiment, in which an approximately upper left half shows an enlarged vertical cross sectional view, and the other shows an enlarged horizontal cross sectional view.

FIG. 5 is an enlarged cross sectional view showing a mounting state of a torque transmission coupling 1B in accordance with a third embodiment, in correspondence to FIG. 4, in which an approximately upper left half shows an enlarged vertical cross sectional view. The same reference numerals or reference numerals obtained by putting B to the same reference numerals are attached to the structure portions in correspondence to the first and second embodiments.

The present embodiment changes arranged positions of a main clutch 131B serving as a connection and disconnection portion of a torque control part 125B and an electromagnet 133B serving as an actuator, with respect to the second embodiment. Accordingly, a coupling case 129B serving as the outer rotating member is integrally formed to a rotating shaft 11B, and a magnetic rotor 111B is integrally later mounted to an end portion of the coupling case 129B.

Further, the present embodiment is provided also with an internal space 78B surrounded by a bearing housing portion 77B, a carrier cover 7B and the partition wall 75.

The electromagnet 133B is arranged to partly enter into the internal space 78B, and a plate which is centered to the outer peripheral surface 74 of the bearing housing portion 77B of the differential carrier 9 and is mounted to a back surface is mounted to the outer peripheral portion of the bearing housing 77B by the bolt 80 to be fixed at positions in a rotational direction and an axial direction. The clutch hub 127B serving as the inner rotating member is structured such that inner plates of the main clutch 131B are spline engaged with a large-diameter portion 137B, and a small-diameter portion 135B is spline engaged with the end portion 185 of the drive pinion shaft 17B. An inner periphery of an end portion of the large-diameter portion 137B in the clutch hub 127B is supported to the rotating shaft 11B by a ball bearing 193 to be relatively rotatable.

Accordingly, when the armature 165 serving as a part of the connection and disconnection portion is attracted by electrifying the electromagnet 133B to fasten the pilot clutch 161 serving as a part of the connection and disconnection portion, the cam plate 167 serving as a part of the connection and disconnection portion is rotated together with the rotating shaft 11B and the coupling case 129B. Therefore, the relative rotation is generated with respect to the pressing plate 169 serving as a part of the disconnection portion integrally rotating with the drive pinion shaft 178B and the cam plate 167. The cam mechanism 163 applies the compression force as the reaction force to the magnetic rotor 111B to the pressing plate 169 in the same manner as mentioned above on the basis of the relative rotation. Therefore, it is possible to couple the main clutch 131B between the pressing plate 169 and the end wall 195 of the coupling case 129B.

The torque can be transmitted to the drive pinion shaft 17B from the rotating shaft 11B through the main clutch 131B in the same manner as mentioned above on the basis of the fastening.

A mutual support relation may be structured between the electromagnet 133B and the coupling case 129B with the bearing. In this case, it is possible to stabilize a magnetic force line passing through between the electromagnet 133B and the coupling case 129B. Further, in accordance with some design, the positioning in the diametrical direction can be completed without fixing the electromagnet 133B to the outer peripheral surface of the bearing housing portion 77B, and only the positioning in the rotational direction may be executed.

In the present embodiment, it is possible to achieve approximately the same operations and effects as those of the first embodiment on the basis of the existence of the internal space 78B or the like.

Further, in the present embodiment, since the electromagnet 133B is arranged in the outer peripheries of the taper roller bearing 117 and the nut 137, it is possible to make the length of the torque transmission coupling 1B in the direction along the rotating axis shorter, it is possible to form entirely compact, and it is possible to achieve the weight saving.

Further, it is possible to make the length of the propeller shaft 5 longer at a degree that the length of the torque transmission coupling 1B is made shorter. Therefore, it is possible to make a mounting angle smaller, and it is possible to inhibit the rotational vibration or the like.

The torque transmission coupling 1B is assembled the rotating shaft 11B and the coupling case 129B, the clutch hub 127B, the main clutch 131B, the cam mechanism 163, the pilot clutch 161 and the magnetic rotor 111B in this order to be sub-assembled in the side of the carrier cover 7B. The electromagnet 133B is mounted to an outer periphery of the bearing housing portion 77B of the differential carrier 9. The sub-assembled carrier cover 7B is assembled in the drive pinion shaft 17B, the clutch hub 127B is spline engaged with the end portion 185 of the drive pinion shaft 17B, and the carrier cover 7B is fastened to the differential carrier 9 by the bolt 97. Accordingly, the assembly of the torque transmission coupling 1B with respect to the differential carrier 9 can be completed.

Accordingly, it is possible to extremely easily carry out the assembly, the replacement, the parts control and the like of the main clutch 131B, the electromagnet 133B, the pilot clutch 161, the cam mechanism 163, the clutch hub 127B, the coupling case 129B and the like.

The first torque transmission mechanism is not limited to the rear differential using the gears, but may be appropriately replaced by a differential using a clutch plate or the like, or the other structures than the differential.

The torque transmission apparatus may be provided as a torque transmission coupling 1C in the output side of the transfer 29, as shown in FIG. 1, or may be provided in the other drive systems.

According to an example of another torque transmission coupling, in the case of being provided in the output side of the transfer 29, the first torque transmission mechanism corresponds to a gear mechanism within the transfer 29, the second torque transmission mechanism corresponds to a torque transmission coupling 1C outputting a torque on the basis of a frictional engagement caused by the electromagnetic force, and the rotating member corresponds to the output shaft 31 outputting the torque to the torque transmission coupling 1C from the transfer 29. Further, the case main body corresponds to a transfer case, and the case cover corresponds to a cover mounted to the transfer case by the same connecting portion so as to receive the torque transmission coupling 1C.

Figure 6:
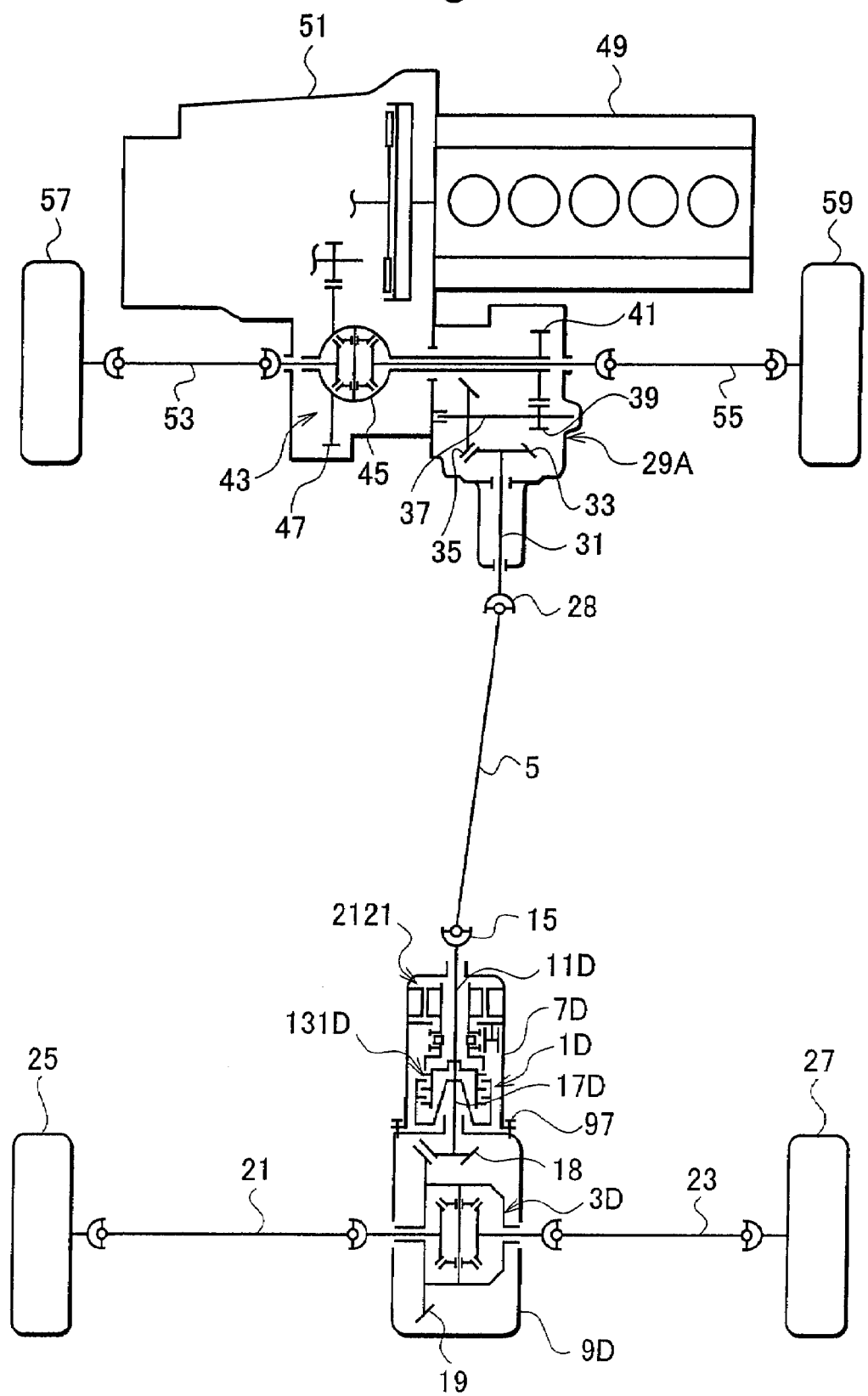
FIG. 6 is a skeleton plan view of a four wheel drive vehicle showing an arrangement of a torque transmission apparatus according to a fourth embodiment.
Figure 7:
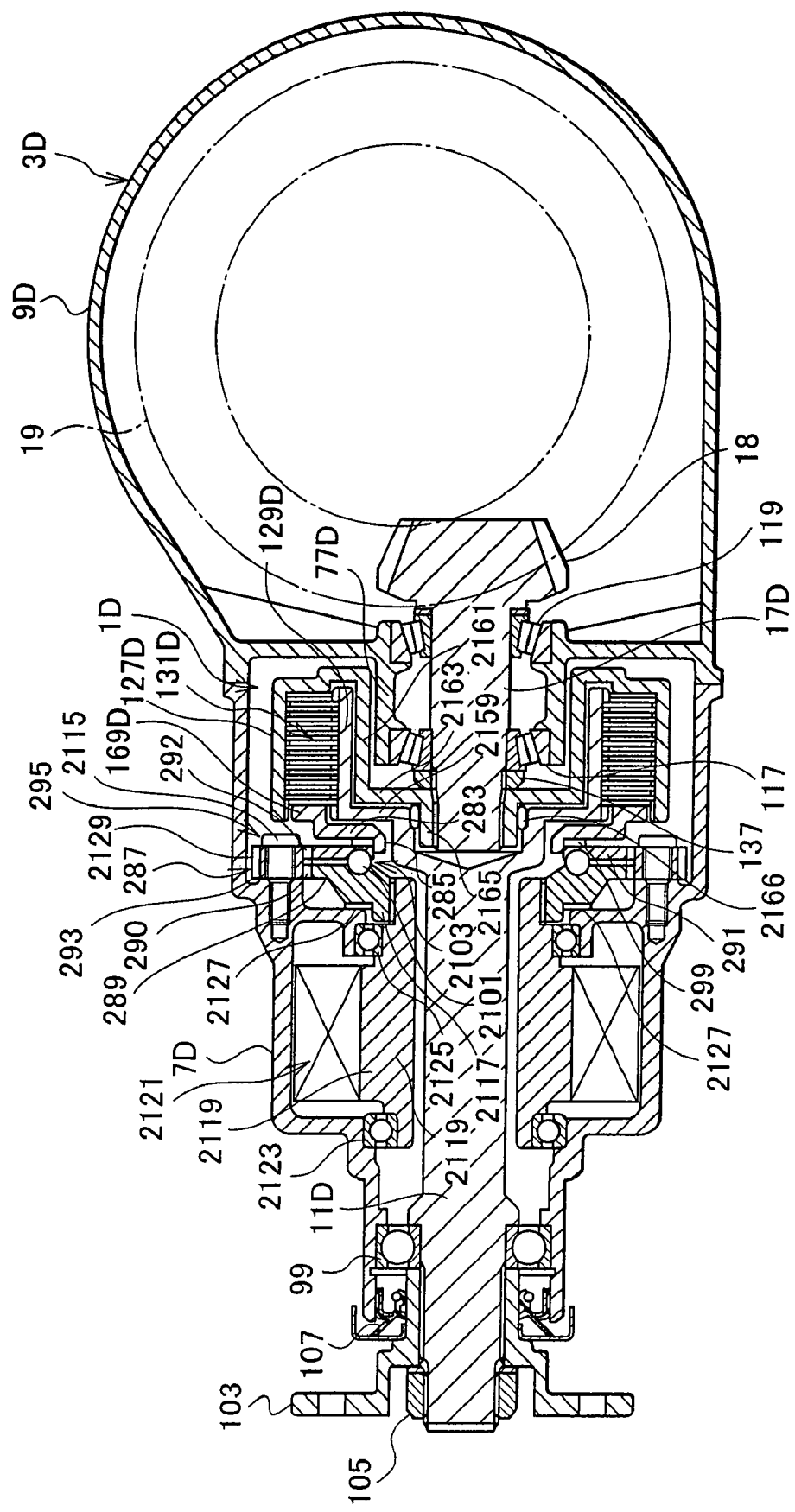
FIG. 7 is an enlarged cross sectional view showing a mounting state of the torque transmission apparatus according to the fourth embodiment, in which an approximately upper left half shows an enlarged vertical cross sectional view, and the other shows an enlarged horizontal cross sectional view.

FIGS. 6 and 7 relates to a fourth embodiment, in which FIG. 6 is a skeleton plan view of a four wheel drive vehicle showing an arrangement of a torque transmission coupling, and FIG. 7 is a vertical cross sectional view of a torque transmission apparatus and a periphery thereof. A basic structure of the present embodiment is the same as the first embodiment in FIG. 1. Accordingly, a description will be given by attaching the same reference numerals or reference numerals obtained by attaching D to the same reference numerals to the structure portions in correspondence to the first embodiment.

The torque transmission coupling 1D in accordance with the present embodiment is received in a carrier cover 7D serving as the support body constitutes the second carrier portion of a rear differential 3D. The carrier cover 7D is attached and fastened and connected to a differential carrier 9D serving as a third carrier portion and a support body side by a bolt 2154. A bearing housing portion 77D is provided in the differential carrier 9D. A drive pinion shaft 17D corresponding to one of the input and output rotating members is supported to the bearing housing portion 77D corresponding to the first carrier portion. The drive pinion gear 18 of the drive pinion shaft 17D is engaged with the ring gear 19 of the rear differential 3D.

The torque transmission coupling 1D is structured such that the actuator is set to an electric motor 2121, and a frictional multiplate clutch 131D serving as a frictional engagement portion constitutes a part of the connection and disconnection portion is fastened through a compression gear set serving as a part of the connection and disconnection portion by driving the electric motor 2121. Accordingly, a torque control part 125C is mainly constituted by the electric motor 2121, the compression gear set 287 and the frictional multiplate clutch 131D.

As shown in FIGS. 6 and 7, the torque transmission coupling 1D is provided with a coupling case 129D serving as the outer rotating member, and a clutch hub 127D serving as the inner rotating member. The coupling case 129D is spline fitted to the drive pinion shaft 17D. The clutch hub 127D is integrally formed to the rotating shaft 11D serving as another of the input and output rotating members, however, is not necessarily integrally formed, and these elements may be formed respectively as independent members to be formed in an integrally rotating manner by a spline connection, a welding or the like. The frictional multiplate clutch 131D is provided between the coupling case 129D and the clutch hub 127D. The frictional multiplate clutch 131D is structured such that outer plates are engaged with the coupling case 129D; and inner plates are engaged with the clutch hub 127D. Accordingly, it is possible to control the torque transmission between the coupling case 129D and the clutch hub 127D, on the basis of the frictional engagement of the frictional multiplate clutch 131D.

The frictional multiplate clutch 131D is arranged in the outer peripheral side of the taper roller bearing 117 rotatably supporting the drive pinion shaft 17D.

Specifically, the clutch hub 127D is integrally connected to the rotating shaft 11D by a vertical wall 2159. The vertical wall 2159 of the clutch hub 127D is arranged in an end portion of the clutch hub 127D to be close to the rotating shaft 11D. The rotating shaft 11D is rotatably supported to the carrier cover 7D by a bearing 99.

A flange member 103 is spline engaged with an outer end portion of the rotating shaft 11D. The flange member 103 fastened to the rotating shaft 11D by a nut 105, so as to be prevented from coming off. The seal 107 is provided between the flange member 103 and the carrier cover 7D. The flange member 103 is connected to the universal joint 15.

An inner tube portion 2161 is integrally provided in an inner peripheral side of the coupling case 129D. A vertical wall 2163 is formed to an end portion of the inner tube portion 2161. An inner peripheral portion 2165 of the vertical wall 2163 is spline connected to the end portion of the drive pinion shaft 17D.

The bearing housing portion 77D is protruded to an inner peripheral side of the inner tube portion 2161. The bearing housing portion 77D supports the taper roller bearings 117 and 119. The taper roller bearings 117 and 119 rotatably support the drive pinion shaft 17D with respect to the bearing housing portion 77D. Further, a bearing 2166 is arranged between the rotating shaft 11D and the inner peripheral portion 2165 of the coupling case 129D, and a mutual support relation is established.

A pressing plate 169D serving as a part of the connection and disconnection portion is arranged in an opposing manner in an end portion between the coupling case 129D and the clutch hub 127D. A pressure receiving portion 283 serving as a part of the connection and disconnection portion is integrally provided in an inner peripheral side in the pressing plate 169D. A support boss portion 285 is provided circumferentially in an inner periphery of the pressure receiving portion 283.

A compression gear set 287 is provided in adjacent to the pressing plate 169D. The compression gear set 287 has a pair of gears 289 and 291 corresponding to a pair of relatively rotatable members, a planetary gear 293 engaging with the gears 289 and 291, and a planetary carrier 295 supporting the planetary gear 293.

In the present invention, the structure is made such that any one of a pair of gears 289 and 291, the planetary gear 293 and the planetary carrier 295 is supported to the carrier cover 7D serving as the support body side, any other one is rotationally driven, and any other one is relatively rotated, thereby converting the input on the basis of the rotational drive into the compression force in the direction along the rotating axis, and frictionally engaging the frictional multiplate clutch 131D.

According to the present embodiment, the structure is made such that the gear 289 is rotationally driven. The gear 289 is formed in a ring shape, and is integrally formed with a ring 2117. A needle bearing 2127 is provided between the gear 289 and the carrier cover 7D. Accordingly, the gear 289 of one of a pair of gears is supported to the carrier cover 7D side in a direction along the rotating axis.

The ring 2117 is spline fixed to an end portion of a hollow rotating drive shaft 2119. The rotating drive shaft 2119 forms an output shaft of the electric motor 2121 serving as the actuator. The rotating drive shaft 2119 is rotatably supported to the carrier cover 7D by seal bearings 2123 and 2125. Accordingly, the electric motor 2121 serving as the actuator and the frictional multiplate clutch 131D corresponding to the frictional engagement portion are arranged such that the rotating axis are coincided with each other. In this case, the electric motor 2121 is arranged in the interior of the carrier cover 7D and is stably supported by the carrier cover 7D. Further, since the electric motor 2121 is supported to be received in the interior of the carrier cover 7D, and is arranged in the frontmost side in the vehicle running direction of the torque transmission coupling 1D, an improvement of a cooling efficiency can be achieved.

The electric motor 2121 forms one sealed space by the carrier cover 7D, the rotating drive shaft 2119 serving as the output shaft of the electric motor 2121 and the seal bearings 2122 and 2125 arranged therebetween. In this case, the carrier cover 7D is provided with a breather (not shown).

The gear 291 is provided in parallel in a direction along the rotating axis with respect to the gear 289, and is supported to be relatively rotatable. The gear 291 is supported to the outer peripheral surface of the support boss portion 285 to be relatively rotatable. A thrust bearing 299 is interposed between the gear 291 and the pressure receiving portion 283.

A cam mechanism 2103 provided with a ball 2101 is provided between a pair of gears 289 and 291. The ball 2101 is arranged on the cam surfaces respectively formed in the gears 289 and 291 to oppose to each other. Tooth portions 290 and 292 are provided on outer peripheral surfaces of the gears 289 and 291 respectively. The gear portion 290 and the gear portion 292 are formed such that the numbers of gears are slightly different from each other, and are both engaged with a tooth portion 2129 of the planetary gear 293.

The planetary gear 293 is rotatably supported to the planetary carrier 295. The planetary carrier 295 comprises a carrier pin 2115 and the carrier cover 7D. The carrier pin 2115 is fixed by screw to the carrier cover 7D. Accordingly, the planetary carrier 295 is supported to the support body side to be non-rotatable. The planetary gear 293 is rotatably supported between the carrier pin 2115 and the carrier cover 7D. The planetary gear 293 supported by the carrier pin 2115 is provided at a plurality of positions in the peripheral directions of the gears 289 and 291 at a predetermined interval.

When the frictional multiplate clutch 131D is not fastened, the coupling case 129D and the clutch hub 127D can be relatively rotated therebetween. Accordingly, even if the torque transmitted from the engine 49 side as mentioned above is input to the clutch hub 127D through the rotating shaft 11D, the torque is not transmitted to the coupling case 129D. Accordingly, the torque transmission coupling 1D is in a state in which it does not transmit the torque. In other words, it is possible to carry out the running under the two-wheel drive state by the front wheels 57 and 59 as mentioned above.

When rotationally driving the electric motor 2121, one gear 289 is integrally rotationally driven through the rotating drive shaft 2119. When the gear 289 is rotationally driven, the planetary gear 293 engaging therewith rotates on its own axis, and the gear 291 engaging with the planetary gear 293 works therewith. In other words, the gear 289 and the gear 291 are both rotated.

The gear ratio between the planetary gear 293 and the gear 89, and the gear ratio between the planetary gear 293 and the gear 291 are set to be slightly different from each other as mentioned above. Accordingly, the gear 291 is relatively rotated at a low speed with respect to the gear 289 while rotating together with the gear 289. On the basis of this relative rotation, the cam surfaces of the gears 289 and 291 run on the ball 2101, and the cam mechanism 2103 is operated to generate the thrust.

The thrust force is applied to the gear 289, and the gear 289 is received by the carrier cover 7D side through the needle bearing 2127. Accordingly, the compression force is applied as the reaction force of the thrust to the gear 291, and the gear 291 moves to the side of the pressure receiving portion 283. On the basis of the movement, the pressure receiving portion 283 is compressed in a direction along the rotating axis via the thrust bearing 299.

In accordance with the compression, the pressing plate 169D is moved in the same direction, and the frictional multiplate clutch 131D is fastened with respect to the coupling case 129D. The frictional multiplate clutch 131D achieves a frictional engaging force in correspondence to the fastening force of the pressing plate 169D, and carries out the torque transmission between the coupling case 129D and the clutch hub 127D.

Accordingly, the torque transmitted from the rotating shaft 11D is transmitted to the coupling case 129D from the clutch hub 127D via the frictional multiplate clutch 131D. The torque is transmitted to the drive pinion shaft 17D from the coupling case 129D, and is output to the side of the rear wheels 25 and 27 from the drive pinion shaft 17D in the manner mentioned above. Accordingly, the vehicle can run in the four wheel drive state driven by the front wheels 57 and 59 and the rear wheels 25 and 27.

Since the rotation transmitted to the gear 291 from the rotating drive shaft 2119 is largely reduced in speed by the relative rotation between the gear 289 and the gear 291 via the planetary gear 93, it is possible to securely fasten the frictional multiplate clutch 131D while making the electric motor 2121 small-sized and compact.

Since the electric motor 2121 can be made small-sized and compact, it is possible to reduce the weight. Further, it is possible to extremely easily arrange within a narrow space such as the carrier cover 7D on the basis of an entirely small-size.

It is possible to adjust the fastening force of the frictional multiplate clutch 131D by adjusting the driving force of the electric motor 2121, and it is possible to finely adjust the torque transmission to the side of the rear wheels 25 and 27 by the adjustment. In this case, since the rotation transmitted to the gear 291 from the rotating drive shaft 2119 is largely reduced in speed as mentioned above, the gears 289 and 291 are relatively rotated at an extremely low speed with respect to the rotational drive of the electric motor 2121, and it is possible to easily carry out the fine adjustment of the frictional multiplate clutch 131D. Accordingly, it is possible to optionally and easily adjust the torque in response to a running condition of the motor vehicle such as a starting, a cornering, a rough road running and the like.

In the present embodiment, since the pressing plate 169D is provided between the frictional multiplate clutch 131D and the compression gear set 287, it is possible to inhibit an increase in size in a radial direction. Further, the frictional multiplate clutch 131D, the pressing plate 169D and the compression gear set 287 are linearly arranged. Accordingly, the pressing plate 169D receives the thrust from the compression gear set 287, securely and smoothly transmits the thrust to the frictional multiplate clutch 131D, and carries out the frictional engagement of the frictional multiplate clutch 131D. Therefore, in the torque transmission coupling 1D, it is possible to easily and securely control the frictional engagement of the frictional multiplate clutch 131D.

According to the present embodiment, as mentioned above, it is possible to securely receive the thrust generated by the compression gear set 287 by the wall in the side of the carrier cover 7D without requiring any special member, and it is possible to apply the reaction force to another gear 291. In other words, since no special member is required for receiving the thrust, it is possible to inhibit the weight increase while sufficiently achieving the fastening for frictionally engaging the frictional multiplate clutch 131D, and it is possible to arrange in the narrow space with no overburden.

Further, the planetary carrier 295 can be constituted by the carrier pin 2115 and the carrier cover 7D, a simple structure is obtained, and it is possible to form entirely compact. Further, it is also possible to achieve the weight reduction.

In accordance with the present embodiment, it is possible to increase a bearing span of the drive pinion shaft 17D, and it is possible to securely support the drive pinion shaft 17D to the bearing housing portion 77D. Further, since the bearing housing portion 77D is formed to be received in the inner peripheral side of the inner tube portion 2161, it is possible to form entirely compact on the basis of an effective utilization of the internal space.

In this case, the seal bearings 2123 and 2125 are employed, however, the space within the carrier cover 7D in which the electric motor 2121 is arranged can be formed as an isolated space by employing bearings which are not of a seal type, and employing oil seals which are arranged in adjacent thereto. Further, a cooling performance of the electric motor 2121 can be improved by providing a plurality of ribs in the outer peripheral portion of the carrier cover 7D in which the electric motor 2121 is arranged, whereby it is possible to improve a durability.

Figure 8:
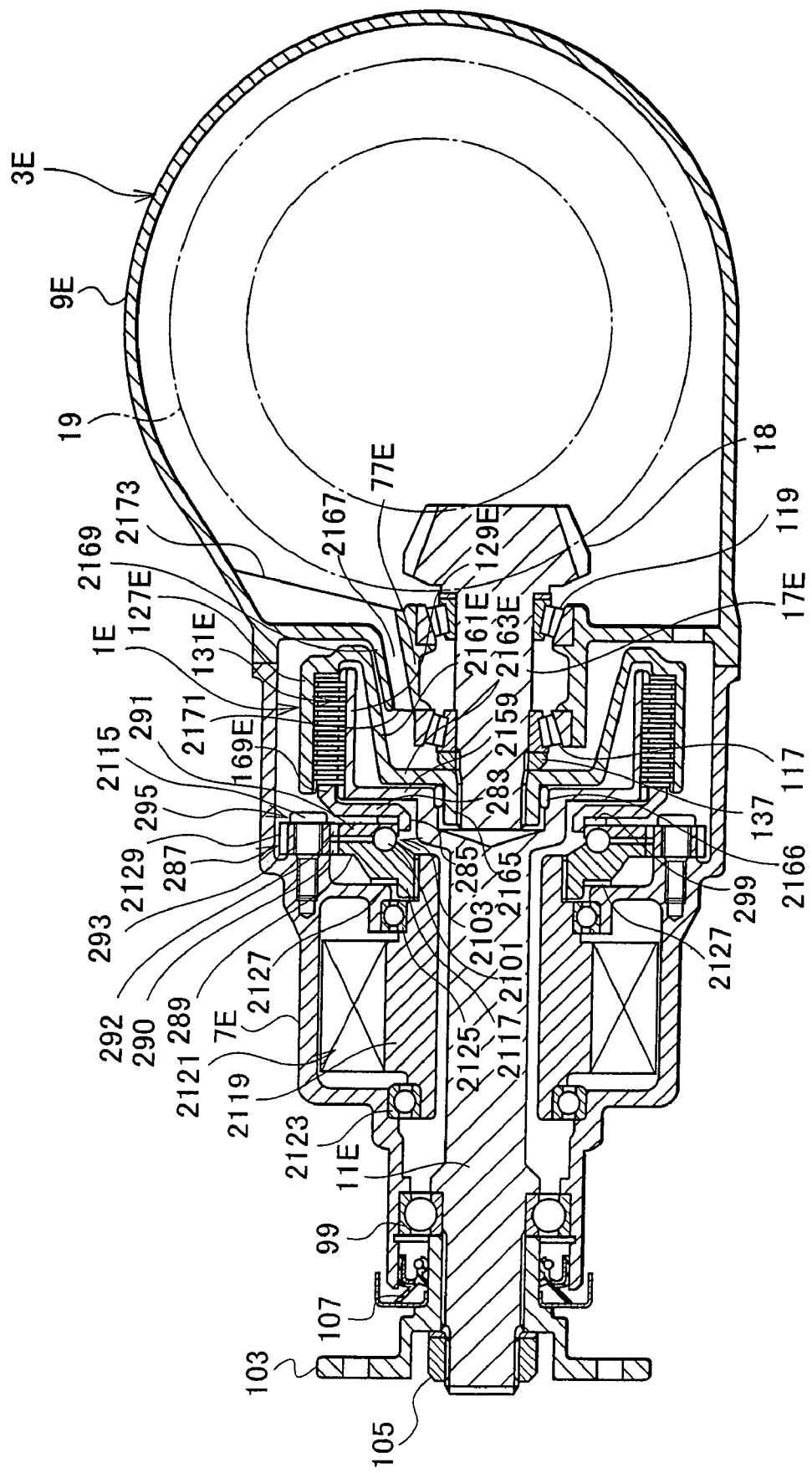
FIG. 8 is a side elevational view showing a part of a torque transmission apparatus by a cross section according to fifth embodiment.

FIG. 8 shows a fifth embodiment according to the present invention and is a vertical cross sectional view of a torque transmission apparatus and a periphery thereof. A basic structure of the present embodiment is the same as the fourth embodiment in FIG. 7. Accordingly, a description will be given by attaching the same reference numerals or reference numerals obtained by attaching E to the same reference numerals to the structure portions in correspondence to the fourth embodiment.

According to the present embodiment, an oil passage 2167 is provided in a bearing housing portion 77E serving as a first carrier portion supporting the taper roller bearings 117 and 119 of a differential carrier 9E serving as a third carrier portion. The oil passage 2167 is extended from one side of the bearing housing portion 77E to another side to introduce a lubricating oil to the taper roller bearing 117. A building-up portion 2169 is provided in an upper outer periphery of the bearing housing portion 77E. The oil passage 2167 is provided in the building-up portion 2169, and is formed to be downward tilted to an end surface 2171 of the building-up portion 2169 from an interior of the differential carrier 9E. The end surface 2171 is positioned at one side end in the outer periphery of the taper roller bearing 117, and the outer periphery of the taper roller bearing 117 is open at this portion. An upper surface of the building-up portion 2169 is formed to be tilted in correspondence to the tilt of the oil passage 2167. An inner tube portion 2161E of a coupling case 129E is formed in a taper shape in correspondence to the tilt. A guide wall 2173 is provided at an end portion of the oil passage 2167 within the differential carrier 9E serving as the third carrier portion. The guide wall 2173 is continuously provided in one side wall of the oil passage 2167.

When the pinion gear 18 and the ring gear 19 are rotated in an engaged state, a splash gear oil within the differential carrier 9E is guided by the guide wall 2173 to reach the oil passage 2167, or the splash gear oil reaches the oil passage 2167 directly. The gear oil in the oil passage 2167 flows to the outer peripheral surface of the taper roller bearing 117 on the basis of the tilt of the oil passage 2167, and the taper roller bearing 117 is sufficiently lubricated by the gear oil.

Accordingly, in the present embodiment, in addition to the operations and effects of the fourth embodiment, it is possible to sufficiently lubricate the taper roller bearing 117 by the gear oil even if the bearing housing portion 77E is made long and the bearing span is increased.

Figure 9:
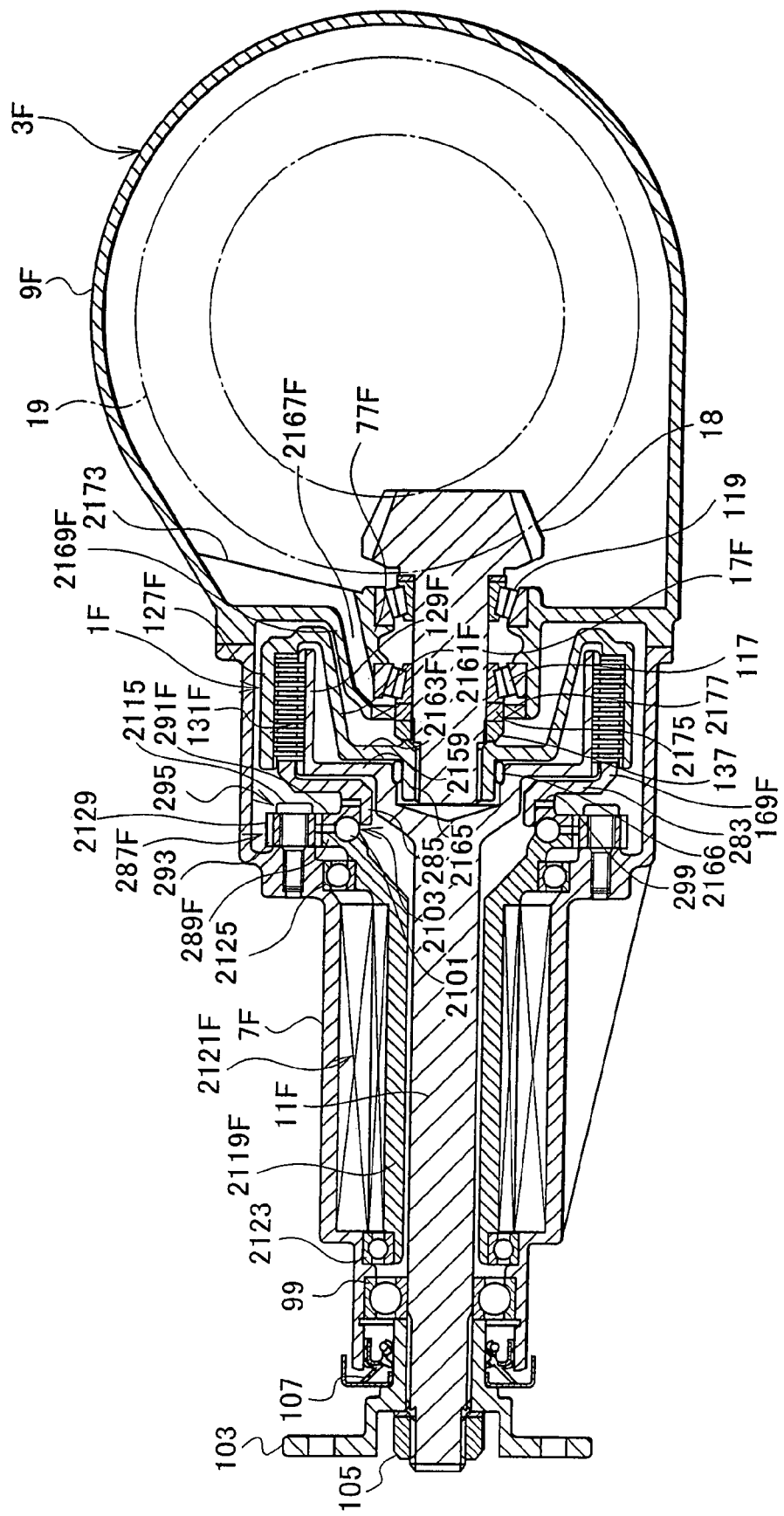
FIG. 9 is an enlarged cross sectional view showing a mounting state of a torque transmission apparatus according to a sixth embodiment, in which an approximately upper left half shows an enlarged vertical cross sectional view, and the other shows an enlarged horizontal cross sectional view.

FIG. 9 shows a sixth embodiment according to the present invention and is a vertical cross sectional view of a torque transmission apparatus and a periphery thereof. A basic structure of the present embodiment is the same as the fifth embodiment in FIG. 8. Accordingly, a description will be given by attaching the same reference numerals or reference numerals obtained by attaching F to the same reference numerals to the structure portions or replacing E by F in correspondence to the fifth embodiment.

In the present embodiment, a bearing housing portion 77F serving as the first carrier portion and a building-up portion 2169F are slightly extended to protrude in a direction along the rotating axis from the taper roller bearing 117. A seal sliding ring 2175 is arranged to oppose to an inner periphery of a leading end of the bearing housing portion 77F. A seal 2177 is provided between the bearing housing portion 77F and the seal sliding ring 2175. The seal sliding ring 2175 is fastened and fixed between the nut 137 and the inner race of the taper roller bearing 117. On the basis of the structure, an oil passage 2167F is extended to reach the outer peripheral surface of the taper roller bearing 117 or a portion between the inner race and the outer race of the taper roller bearing 117.

A electric motor 2121F serving as the actuator in accordance with the present embodiment is formed long, and a gear 289F of a compression gear set 287F is integrally provided in an end portion of a rotating drive shaft 2119F.

According to the present embodiment, the splash gear oil reaching the oil passage 2167F flows to the outer periphery of the taper roller bearing 117 on the basis of the tilt of the oil passage 2167F. The gear oil flows between the inner race and the outer race from the outer periphery of the taper roller bearing 117 to securely lubricate the taper roller bearing 117. A surplus oil at a time of lubricating the taper roller bearing 117 flows through the inner peripheral side of the bearing housing portion 77F, and can be returned into the differential carrier 9F serving as the third carrier portion while lubricating another taper roller bearing 119. A side of a frictional multiplate clutch 131F serving as the frictional engagement portion constitutes a part of the connection and disconnection portion is sectioned by a seal 2177 with respect to the taper roller bearing 117 side. It is possible to use a different oil from the gear oil, for example, automatic transmission fluid or the like. It is possible to properly lubricate the frictional multiplate clutch 131F or the like by the automatic transmission fluid independent from the taper roller bearing 117 or the like.

Therefore, in accordance with the present embodiment, in addition to the operations and effects of the fifth embodiment, it is possible to more securely lubricate the taper roller bearing 117, and it is possible to securely and properly lubricate the side of the taper roller bearing 117 and the side of the frictional multiplate clutch 131F respectively by the proper oils.

Further, since the electric motor 2121F is formed long, it is possible to make the outer peripheral diameter smaller at this portion.

Figure 10:
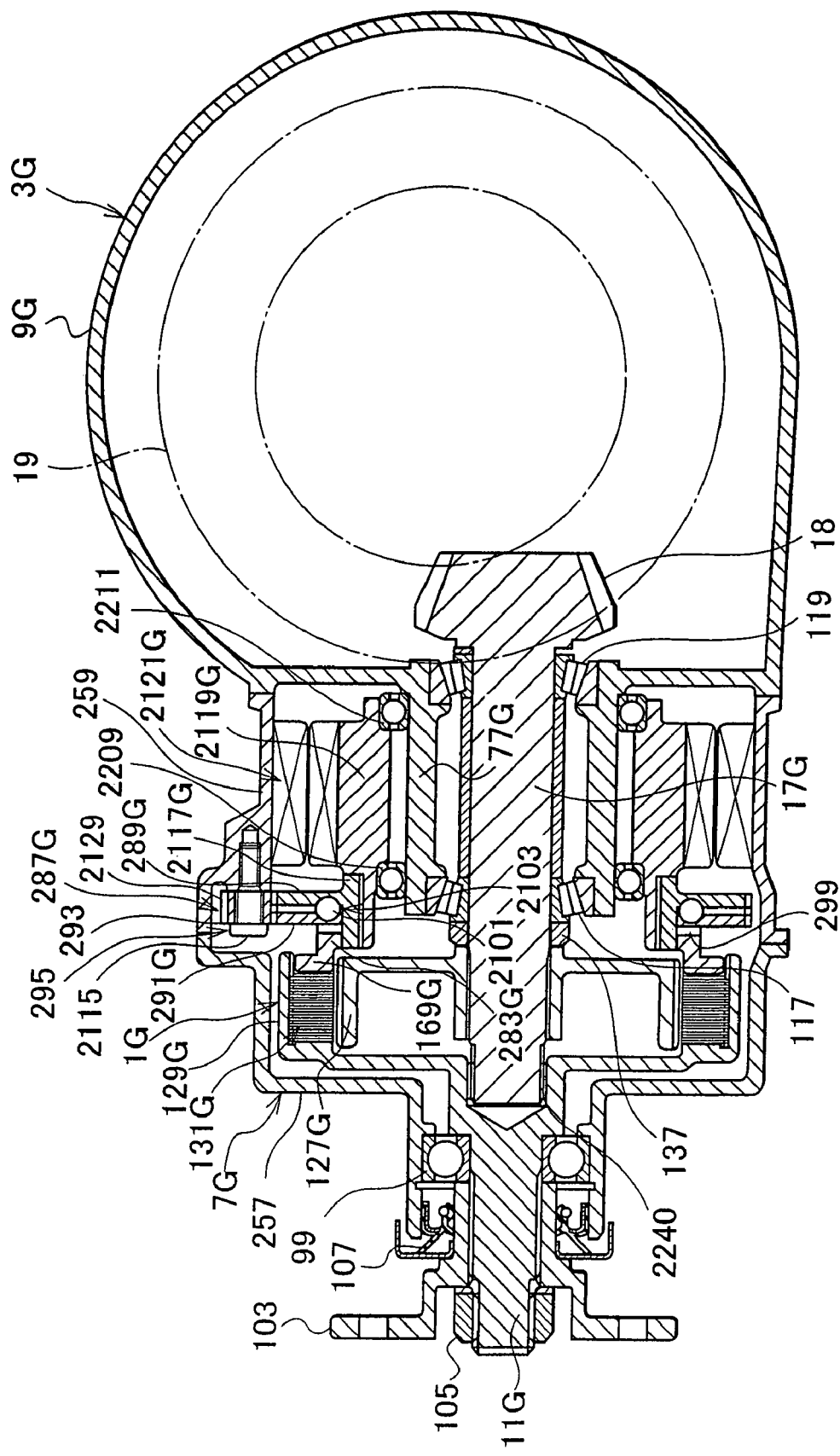
FIG. 10 is an enlarged cross sectional view showing a mounting state of a torque transmission apparatus according to seventh embodiment, in which an approximately upper left half shows an enlarged vertical cross sectional view, and the other shows an enlarged horizontal cross sectional view.

FIG. 10 shows a seventh embodiment according to the present invention and is a vertical cross sectional view of a torque transmission apparatus and a periphery thereof. A basic structure of the present embodiment is the same as the fourth embodiment in FIG. 7, and a description will be given by attaching the same reference numerals or reference numerals obtained by attaching G to the same reference numerals to the structure portions or replacing D by G in correspondence to FIG. 7.

The present embodiment is structured such that axial positions are replaced between a frictional multiplate clutch 131G serving as a part of the connection and disconnection portion and an electric motor 2121G serving as the actuator in comparison with the fourth embodiment.

A cover end portion 257 and a cover body portion 259 serving as a fourth carrier portion are separated from a carrier cover 7G serving as the second carrier portion in accordance with the present embodiment. The cover end portion 257 is detachably connected to the cover body portion 259 by a bolt or the like, and the cover body portion 259 is detachably connected to a differential carrier 91 by a bolt or the like with taking into consideration a relative position of the torque transmission coupling 1G arranged in an interior.

The electric motor 2121G is received in an interior of the cover body portion 259 connected to the differential carrier 9G, and is arranged in an outer peripheral side of the taper roller bearings 117 and 119.

Namely, a bearing housing portion 77G serving as the first carrier portion integrally formed in the differential carrier 9G is provided in a protruding manner in an inner peripheral side of the cover body portion 259, and the taper roller bearings 117 and 119 are supported to the bearing housing portion 77G. A drive pinion shaft 17G is rotatably supported to the bearing housing portion 77G by the taper roller bearings 117 and 119.

A rotating drive shaft 2119G serving as a part of the actuator is rotatably supported to an outer periphery of the bearing housing portion 77G through bearings 2209 and 2211. An inner race of the bearing 2211 is struck against and supported to a step portion formed in one end of the bearing housing portion 77G in a direction along a rotating axis in a side of the differential carrier 9G.

A gear 289G of a compression gear set 287G is spline connected to the rotating drive shaft 2119G.

Among a coupling case 129G serving as an outer rotating member of the torque transmission coupling 1G and a clutch hub 127G serving as an inner rotating member, the coupling case 129G is integrally formed to the rotating shaft 11G, and the clutch hub 127G is spline connected to a drive pinion shaft 17G serving as another of the input and output members. A needle bearing 2240 is arranged between the rotating shaft 11G and the drive pinion shaft 17G, and a mutual support relation is directly carried out.

Further, when rotationally driving the electric motor 2121G, one gear 289G is integrally rotationally driven via the rotating drive shaft 2119G. When the gear 289G is rotationally driven, the planetary gear 293 engaging therewith rotates on its own axis, and the gear 291G engaging with the planetary gear 293 work therewith. In other words, the gears 289G and 291G are both rotated.

The gear ratio between the planetary gear 293 and the gear 289G, and the gear ratio between the planetary gear 293 and the gear 291G are set to be slightly different from each other as mentioned above. Accordingly, the gear 291G is relatively rotated at a low speed with respect to the gear 289G while rotating together with the gear 289G. On the basis of this relative rotation, a cam mechanism 2103G is operated in the same manner as mentioned above to generate the thrust.

The gear 291G is supported to the differential carrier 9GI in a direction along the rotating axis via the rotating drive shaft 2119G and the bearing 2211. Accordingly, the thrust is received by the differential carrier 9G, and the gear 291G is moved to a pressure receiving portion 283G on the basis of the reaction force. On the basis of the movement, in the same manner as mentioned above, the frictional multiplate clutch 131G can be fastened through the pressing plate 161G. The gear 289G, the planetary gear 293, the gear 291G, the cam mechanism 2103G and the pressure receiving portion 283G constitute the connection and disconnection portion together with the frictional multiplate clutch 131G.

Therefore, in accordance with the present embodiment, it is also possible to achieve approximately the same operations and effects as those of the fourth embodiment. Further, it is possible to increase the bearing span of the drive pinion shaft 17G and it is possible to securely support the drive pinion shaft 17G to the bearing housing portion 77G. Further, the bearing housing portion 77G is arranged in an inner peripheral side of the electric motor 2121G. It is possible to form entirely compact on the basis of an effective utilization of the internal space.

Further, since the electric motor 2121G is arranged in an outer peripheral side of the bearing housing portion 77GI, it is possible to shorten the torque transmission coupling 1G in an axial direction. Further, since it is possible to increase a volumetric capacity of the electric motor 2121G while effectively laying out the arrangement space, the drive torque (the operating force) for fastening the frictional multiplate clutch is improved, and an operation response is improved. The cam mechanism 2103G and the gear 289G, the planetary gear 293 and the gear 291G are positioned in the outer peripheral side of the bearing housing portion 77G, and it is possible to obtain a compact structure in the axial direction and a high speed reduction.

Figure 11:
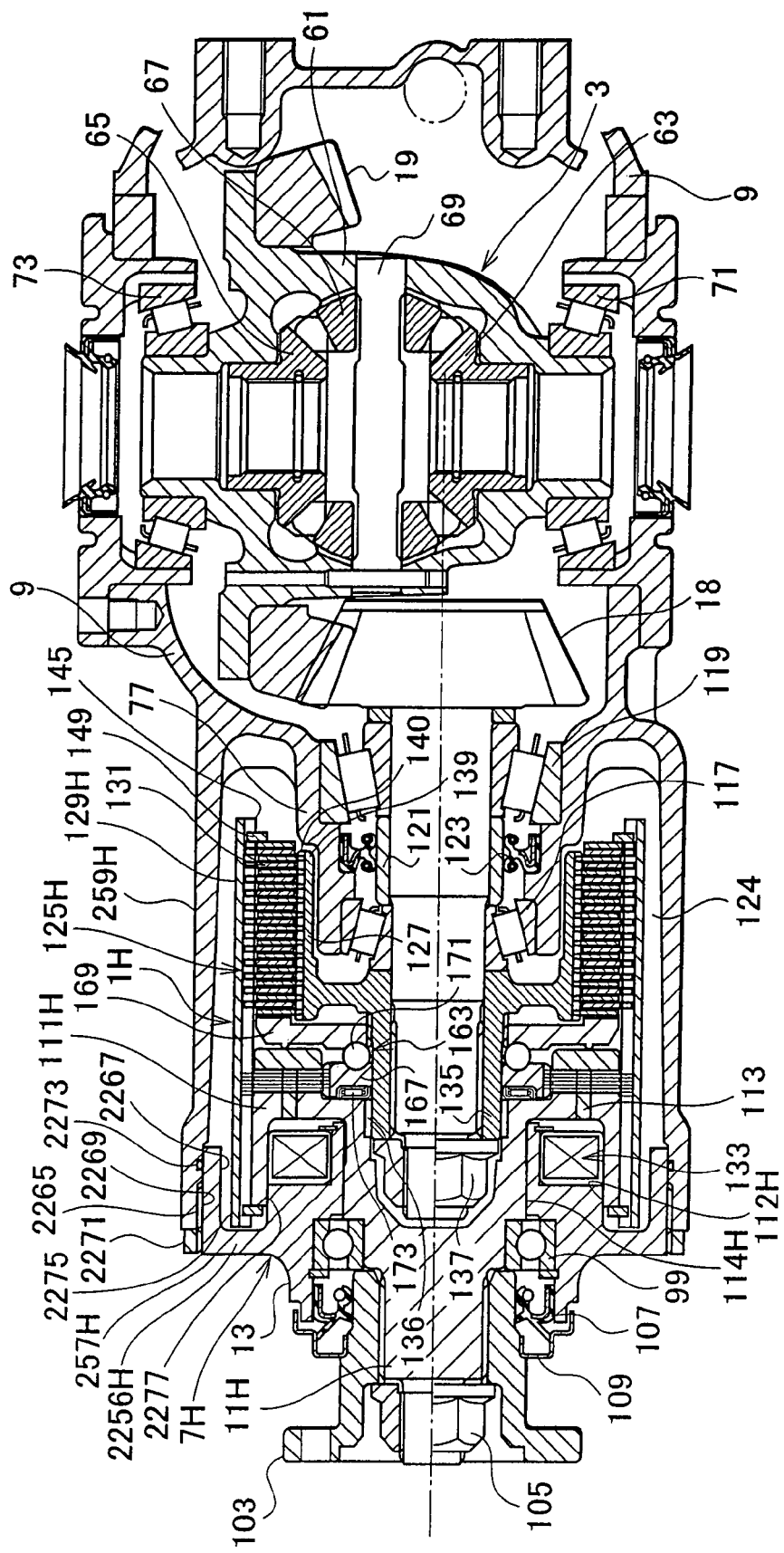
FIG. 11 is an enlarged cross sectional view showing a mounting state of a torque transmission apparatus according to eighth embodiment, in which an approximately upper left half shows an enlarged vertical cross sectional view, and the other shows an enlarged horizontal cross sectional view.

FIG. 11 is an enlarged cross sectional view showing a mounting state of a torque transmission apparatus according to an eighth embodiment of the present invention, in which an approximately upper left half shows an enlarged vertical cross sectional view, and the other shows an enlarged horizontal cross sectional view. A basic structure of the present embodiment is approximately the same as the first embodiment in FIG. 1, and a description will be given by attaching the same reference numerals or reference numerals obtained by attaching H to the same reference numerals in correspondence to FIG. 1.

The torque transmission coupling 1H in accordance with the present embodiment is structured such that a carrier cover 7H serving as a fourth carrier portion is changed. The carrier cover 7H is formed in a separated manner at an end portion of a cover body portion 259H serving as the second carrier portion formed in a cylindrical shape integrally with the differential carrier 9 serving as the first carrier portion, and is integrally fixed detachably. The carrier cover 7H has a radial wall 2256H, and a fixed portion and the boss portion 13 are integrally formed in an outer peripheral side and an inner peripheral side thereof, respectively.

A male screw portion 2265 is provided in an outer periphery of the cover end portion 257H. A recess portion 2267 is formed circumferentially in an inner surface side of the cover end portion 257H.

A female screw portion 2269 is provided at an opening side end portion, in an end portion in an axial direction of the cover body portion 259H. The male screw portion 2265 of the cover end portion 257H is screwed with the female screw portion 2269 of the cover body portion 259H, and the cover end portion 257H is connected to the cover body portion 259H. A lock nut 2271 is tightened to the male screw portion 2265 of the cover end portion 257H, the cover end portion 257 is prevented from being slack with respect to the cover body portion 259H. A seal 2273 is supported so as to be received in the cover body portion 259H side, and is brought into close contact with an outer peripheral surface of the cover end portion 257H.

An end portion 2275 of the coupling case 129H is arranged in the recess portion 2267. An end portion 2277 of a magnetic rotor 111H is extended within the recess portion 2267 in the same manner, and air gaps 112H passing through a magnetic force line are formed between the end portion 2277 and the core portion on the back surface of the coil of the electromagnet 133 serving as the actuator. Another air gap 114H is formed between the rotor 111H and the core.

Further, in accordance with the present embodiment, it is also possible to achieve the same operations and effects as those of the first embodiment.

Further, it is possible to adjust positions of the cover end portion 257H of the carrier cover 7H with respect to the cover body portion 259H on the basis of the screw adjustment of the female screw portion 2269 and the male screw portion 2265. When adjusting the position of the cover end portion 257H with respect to the cover body portion 259H, the force is sequentially transmitted to the cover end portion 257H, the magnetic rotor 111H, the connection and disconnection portion (the cam mechanism 163, the pressing plate 169 and the main clutch 131), and the coupling case 129H, and it is possible to easily adjust the position of the coupling case 129H or the like.

Further, since the cover end portion 257H is connected to the cover body portion 259H by the male screw portion 2265 and the female screw portion 2269, the portion protruding to the outside of the carrier cover 7H is restricted, and can be easily avoided from being interfered with the other parts.

It is possible to arrange the end portion 2275 of the coupling case 129H and the end portion 2277 of the magnetic rotor 111H to extend within the recess portion 2267 of the cover end portion 257H, and it is possible to more securely achieve a spline connection between the coupling case 129H and the magnetic rotor 111H.

Figure 12:
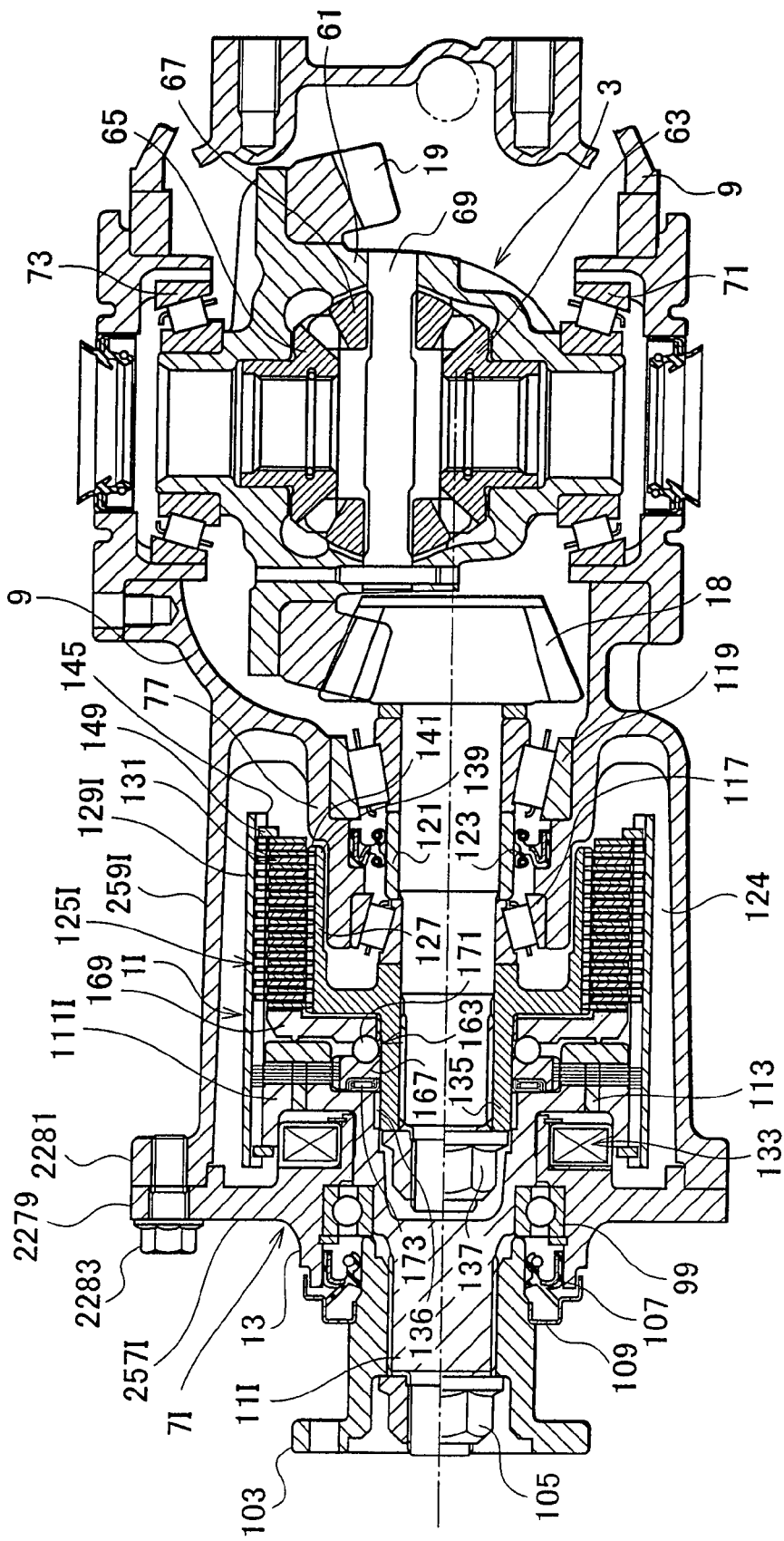
FIG. 12 is an enlarged cross sectional view showing a mounting state of a torque transmission apparatus according to ninth embodiment, in which an approximately upper left half shows an enlarged vertical cross sectional view, and the other shows an enlarged horizontal cross sectional view.
Figure 13C:
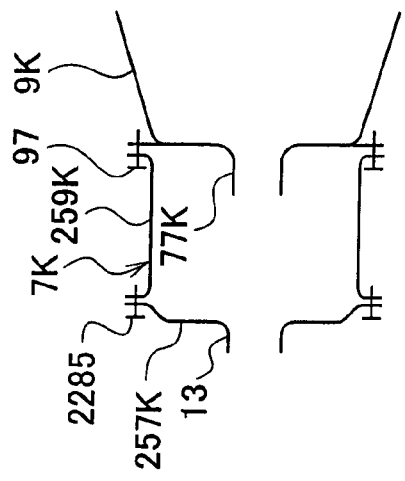
FIGS. 13(*a*) to 13(*f*) are skeleton cross sectional views showing a mounting state of a carrier cover with respect to a differential carrier according to the present invention.
Figure 13B:
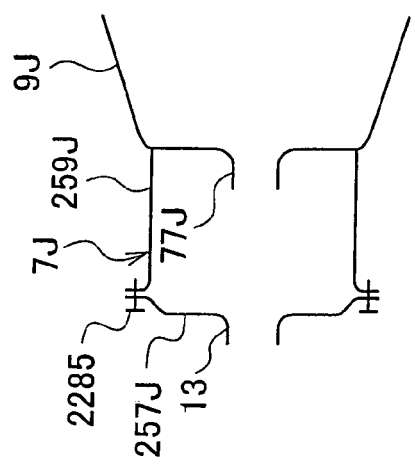
Figure 13A:
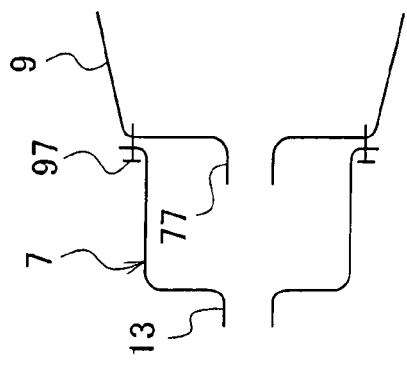
Figure 13F:
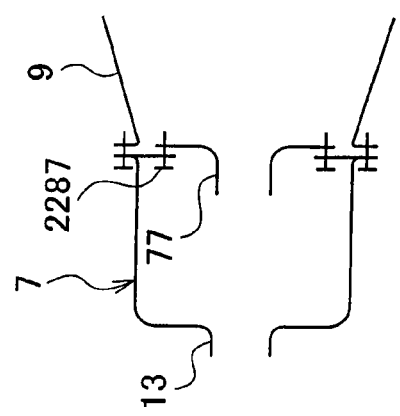
Figure 13E:
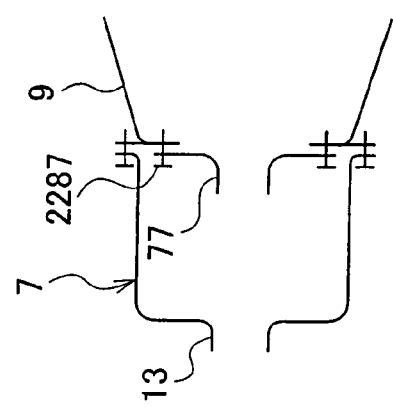
Figure 13D:
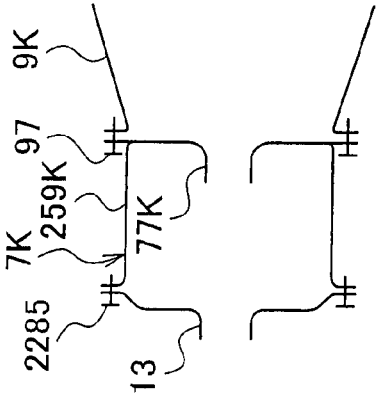

FIG. 12 is an enlarged cross sectional view showing a mounting state of a torque transmission apparatus according to a ninth embodiment of the present invention, in which an approximately upper left half shows an enlarged vertical cross sectional view, and the other shows an enlarged horizontal cross sectional view. A basic structure of the present embodiment is approximately the same as the eighth embodiment in FIG. 11, and a description will be given by attaching the same reference numerals or reference numerals obtained by attaching I to the same reference numerals or replacing H by I in correspondence to FIG. 11.

The torque transmission coupling 1I in accordance with the present embodiment is structured such that a connecting structure of a cover end portion 257I of a carrier cover 7I and a cover body portion 259I is changed.

The cover end portion 257I and the cover body portion 259I are provided with connection flanges 2279 and 2281 respectively. The connection flanges 2279 and 2281 are fastened by a plurality of bolts 2283 provided at a predetermined interval in a circumferential direction, and the cover end portion 257I is connected to the cover body portion 259I.

Accordingly, the present embodiment can achieve approximately the same operations and effects as those of the eighth embodiment.

The carrier structure may be variously changed in a division selection of the first to fourth carrier portions, while taking into consideration a support state and an outer shape of the input and output rotating members, an assembling procedure thereof, a support state and an outer shape of the torque control mechanism, an assembling procedure thereof, a support state and an outer shape of the actuator, and an assembling procedure thereof, as shown in FIG. 13. FIGS. 13(a) to 13(f) are skeleton cross sectional views showing the division selection and the mounting state of the first, second and fourth carriers with respect to the differential carrier serving as the third carrier portion. FIG. 13(a) shows a structure applied to the first embodiment or the like. FIG. 13(b) shows a structure in which a cover end portion 257J serving as the fourth carrier portion is constructed in a divisional manner in a carrier cover 7J serving as the second carrier portion having a cover body portion 259J, the cover body portion 259J is integrally provided in a differential carrier 9J serving as the first carrier portion, and the cover end portion 257J is connected to the cover body portion 259J by a bolt 2285. Further, a bearing housing portion 77J serving as the first carrier portion is integrally provided in the differential carrier 9J. FIG. 13(c) shows a structure in which a cover end portion 257K serving as the fourth carrier portion is constructed in a divisional manner in a carrier cover 7K serving as the second carrier portion having a cover body portion 259K, the divided cover body portion 259K is connected to a differential carrier 9K serving as the first carrier portion by a bolt 97, and the cover end portion 257K is connected to the cover body portion 259K by the bolt 2285. A bearing housing portion 77K serving as the first carrier portion is integrally provided in the differential carrier 9K. FIG. 13(d) corresponds to a modified embodiment of FIG. 13(c), and shows a structure in which a bearing housing portion 77K serving as the first carrier portion is integrally provided in a cover body portion 259K side of a carrier cover 7K serving as the second carrier portion, and is integrally mounted to a divided differential carrier 9K serving as the third carrier portion by a bolt. FIG. 13(e) corresponds to a modified embodiment of FIG. 13(a), and shows a structure in which the bearing housing portion 77 serving as the first carrier portion is formed in a divisional manner as a separate body from the differential carrier 9, and the bearing housing portion 77 is connected to the differential carrier 9 by a bolt 2187. FIG. 13(f) corresponds to a modified embodiment of FIG. 13(a), and shows a structure in which the bearing housing portion 77 is formed in a divisional manner as a separate body from the differential carrier 9, and the bearing housing portion 77 is connected to the carrier cover 7 by the bolt 2187.

In the embodiment mentioned above, at least a part of the torque control part 125 is arranged in the outer periphery of the bearing. However, a whole of the torque control part 125 may be arranged. The structure of the torque control mechanism is not limited to the embodiments mentioned above, but may employ a structure in which an actuator is provided to enable external control such that the torque is transmitted between the input and output rotating members on the basis of a fastening force caused by a fluid pressure of a pump or the like, or a structure in which a torque transmission caused by a shearing resistance is partially added thereto. In specific, it is possible to employ a structure in which the torque transmission can be controlled without any external control, such as a viscous coupling, an oil pump, a structure in which the multi disc clutch is pressed on the basis of a discharge pressure of the oil pump serving as a trigger, a rotary blade coupling, a coupling using a dilatant fluid or the like.

In the embodiment mentioned above, the structure is made such that the main clutch 131 or the electromagnet 133B, the frictional multiplate clutch 209 are positioned in the outer periphery of one taper roller bearing, however, the structure may made such that they are positioned in the outer peripheries of both the taper roller bearings.

Further, the actuator can be selected from an annular or circumferential hydraulic piston cylinder arranged in the outer peripheral side of the bearing, a magnetic fluid, employing shift rod and shift fork, or the like.

The frictional engagement portion is not limited to the frictional multiplate clutch, and can be optionally selected from a cone clutch and the like, as far as the frictional engagement portion generates the frictional engagement force on the basis of the fastening.

The arrangement of the torque transmission coupling 1D, 1E, 1F, 1G, 1H, 1I, 1J, and 1K is not limited to the arrangement mounted to the rear differential side, and the torque transmission apparatus can be arranged at the output side of the transfer 29A, at the propeller shaft 5 between the transfer 29A and the rear differential, between the front wheel side axle shafts 53 and 55 or the rear wheel side axle shafts 21 and 23, between the output of the engine 49 serving as the prime mover and a starting clutch, as a torque transmission apparatus of inner sub driving wheel side of main and sub driving wheels of 4WD system employing a motor or a hybrid motor vehicle, or as a limited slip differential. In this case, the connection of each of the shafts is achieved by appropriately changing in the same manner as the torque transmission couplings 1, 1A, 1B and 1C.

In the case of being interposed in the propeller shaft 5, the torque can be transmitted to the rear wheels 25 and 27 side in the same manner as mentioned above on the basis of the fastening adjustment. When the torque transmission coupling is set to a torque non-transmission state, the rotation from the rear wheels 25 and 27 is not transmitted to the constant velocity universal joint 15 or the like in the upstream side of the torque transmission coupling, whereby an energy loss can be reduced at that degree.

In the case of being interposed between the rear wheel side axle shafts 21 and 23, when the torque transmission coupling is set to the torque non-transmission state, the rotation from the rear wheels 25 and 27 is not transmitted to the rear differential 3 side, whereby an energy loss at the two-wheel driving time can be more restricted. In this case, the structure may be made such that it is provided in only one of the axle shafts 21 and 23.

In the case of being interposed between the front wheel side axle shafts 53 and 55, the same matter as the case of interposed between the axle shafts 21 and 23 is applied.

What is claimed is:

1. A case structure, comprising:
   a case main body including a case main body connection portion which is disposed at an end of said case main body;
   a case cover including a case cover connection portion which is disposed at an end of said case cover, said case cover being mounted to the case main body by said case main body connection portion and said case cover connection portion which are brought into confronted contact thereby defining a case main body side and a case cover side corresponding respectively to general positions of said case main body and said case cover;
   a first torque transmission mechanism being received in the case main body side;
   a second torque transmission mechanism being received in the case cover side;
   a rotating member being rotationally supported and transmitting torque between the first and second torque transmission mechanisms;
   a partition wall sectioning said case main body side from said case cover side, said partition wall including a support portion rotationally supporting the rotating member, said support portion protruding outward from a remainder of the partition wall to extend inward of the case cover; and
   said case cover, said support portion and the remainder of said partition wall collectively defining an internal space open to the case cover side.

2. A case structure as claimed in claim 1, wherein the internal space is formed in a cylindrical shape.

3. A case structure as claimed in claim 1, wherein the case cover connection portion is set to be positioned closer to the case main body rather than a leading end portion of the support portion which protrudes outward from the remainder of the partition wall to extend inward of the case cover.

4. A case structure as claimed in claim 1, wherein the partition wall includes a bulged portion bulging toward the case main body side; and
   an inside of the bulged portion defining a recess in the partition wall to enlarge the internal space.

5. A case structure as claimed in claim 1, wherein the first torque transmission mechanism comprises a differential, the second torque transmission mechanism comprises a torque control mechanism transmitting an input torque, and the rotation member comprises a pinion shaft transmitting a torque from the torque control mechanism to the differential.

6. A case structure as claimed in claim 1, wherein the first torque transmission mechanism comprises a transfer, the second torque transmission mechanism comprises a torque control mechanism transmitting an output torque, and the rotation member comprises an output shaft transmitting a torque from the transfer to the torque transmission coupling.

7. A case structure according to claim 1, further comprising:
   a seal member disposed between the support portion and the rotating member so that an interior space of the case main body and an other interior space of the case cover are separated by the partition wall, the support portion, the rotating member and the seal member to receive different lubricant in said interior space and said other interior space.

8. A case structure according to claim 1, wherein:
said support portion includes a bearing housing integral with said partition wall; and
at least a portion of said bearing housing and said second torque transmission mechanism having an overlapping axial extent.

9. A case structure, comprising:
a case main body;
a case cover, said case main body and said case cover including connection portions, one of the connection portions being disposed at an end of the case main body and an other of the connection portions being disposed at an end of the case cover, the connection portions having contact faces that come in contact with each other in an axial direction, said case cover being mounted to said case main body by said connection portions;
a first torque transmission mechanism being received in a case main body side;
a second torque transmission mechanism being received in a case cover side;
a rotating member rotationally supported and transmitting torque between the first and second torque transmission mechanisms;
a partition wall sectioning between the case main body and the case cover, said partition wall having a surface correspondingly positioned in the case cover side with a position of the contact faces in the axial direction;
a support portion defined by a leading portion of the partition wall protruding outward from a remainder of the partition wall to extend inward of the case cover, said support portion rotationally supporting the rotating member; and
the case cover, the support portion and the partition wall in an outer peripheral side of the support portion collectively defining an internal space opening to the case cover side.

10. A case structure, comprising:
a case main body and a case cover attached to the case main body;
a first torque transmission mechanism being received in a case main body side;
a second torque transmission mechanism being received in a case cover side;
a rotating member rotationally supported and transmitting torque between the first and second torque transmission mechanisms;
a partition wall sectioning between the case main body and the case cover;
a support portion continuously formed on an inner peripheral side of the partition wall and rotationally supporting the rotating member through a pair of bearings; and
a seal member disposed between the support portion and the rotating member and between the bearings so that an interior space of the case main body and an other interior space of the case cover are separated by the partition wall, the support portion, the rotating member and the seal member to receive different lubricants in said interior space and said other interior space.

* * * * *